United States Patent
Zhang et al.

(10) Patent No.: US 6,483,543 B1
(45) Date of Patent: Nov. 19, 2002

(54) SYSTEM AND METHOD FOR TRANSCODING MULTIPLE CHANNELS OF COMPRESSED VIDEO STREAMS USING A SELF-CONTAINED DATA UNIT

(75) Inventors: Ji Zhang, San Jose, CA (US); Scott Stovall, Bonny Doon, CA (US); Fang Wu, San Jose, CA (US); Yitong Tse, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/244,326

(22) Filed: Feb. 3, 1999

Related U.S. Application Data
(60) Provisional application No. 60/094,364, filed on Jul. 27, 1998.

(51) Int. Cl.$^7$ .................................................. H04N 7/18
(52) U.S. Cl. .................................. 348/390; 375/240.08
(58) Field of Search ....................... 375/240.02, 240.07, 375/240.26

(56) References Cited

U.S. PATENT DOCUMENTS

| | | | |
|---|---|---|---|
| 5,537,440 A | 7/1996 | Eyuboglu et al. | ............ 375/245 |
| 5,708,473 A | 1/1998 | Mead | ......................... 348/416 |
| 5,729,293 A | * 3/1998 | Keesman | .................... 348/401 |

(List continued on next page.)

OTHER PUBLICATIONS

"Generic Coding of Moving Pictures and Associated Audio"; (ISO/IEC 13818), Nov. 13, 1994; (MPEG–2); p. 1–209.

"Architectures For MPEG Compressed Bit–stream Scaling"; IEEE Transactions on Circuits and Systems for Video Technology, vol. 6, No. 2, Apr. 1996, H. Sun, W. Kwok & J.W. Zdepski.

"Joint Encoder And Channel Rate Control Of VBR Video Over ATM Networks"; IEEE Transactions on Circuits and Systems for Video Technology, vol. 7, No. 2, Apr. 1997, W. Ding.

*Primary Examiner*—Andy Rao
(74) *Attorney, Agent, or Firm*—Beyer,Weaver, &Thomas, LLP.

(57) ABSTRACT

A system for transcoding multiple channels of compressed video streams using a self contained data unit such as an autonomous frame includes an autonomous frame processing unit having an autonomous frame generator and an autonomous frame recoder. The autonomous frame generator receives video data and divides it into a series of autonomous frames. Each autonomous frame preferably comprises 1) a frame header including all header information from the original video data plus enough additional information to allow the frame to be recoded using predefined autonomous frame structure, and 2) a frame payload including the original video data information. The autonomous frame recoder process the autonomous frames including extracting processing parameters, extracting the video data and setting up or initializing the recoder to process the extracted video data. The autonomous frame recoder preferably further comprises a parser coupled to an initialization unit and a recoder. The present invention also includes a method for processing video data including the steps of: receiving a video bitstream, storing recoding information, dividing the video bitstream into a plurality of autonomous frames each frame including a portion of the video bitstream and recoding information, outputting the plurality of autonomous frames, receiving the plurality of autonomous frames, extracting processing information from the autonomous frame, extracting video data from the autonomous frame, setting the recoding according to the processing information and recoding the extracted video data.

27 Claims, 13 Drawing Sheets

U.S. PATENT DOCUMENTS

| | | | |
|---|---|---|---|
| 5,805,224 A | | 9/1998 | Keesman et al. ............ 348/405 |
| 6,041,068 A | * | 3/2000 | Rosengren et al. ......... 370/538 |
| 6,058,122 A | * | 5/2000 | Hwang et al. .............. 370/522 |
| 6,157,673 A | * | 12/2000 | Cuccia ........................ 375/240 |
| 6,215,824 B1 | * | 4/2001 | Assuncao .............. 375/240.26 |
| 6,275,536 B1 | * | 8/2001 | Chen et al. ............ 375/240.25 |

* cited by examiner

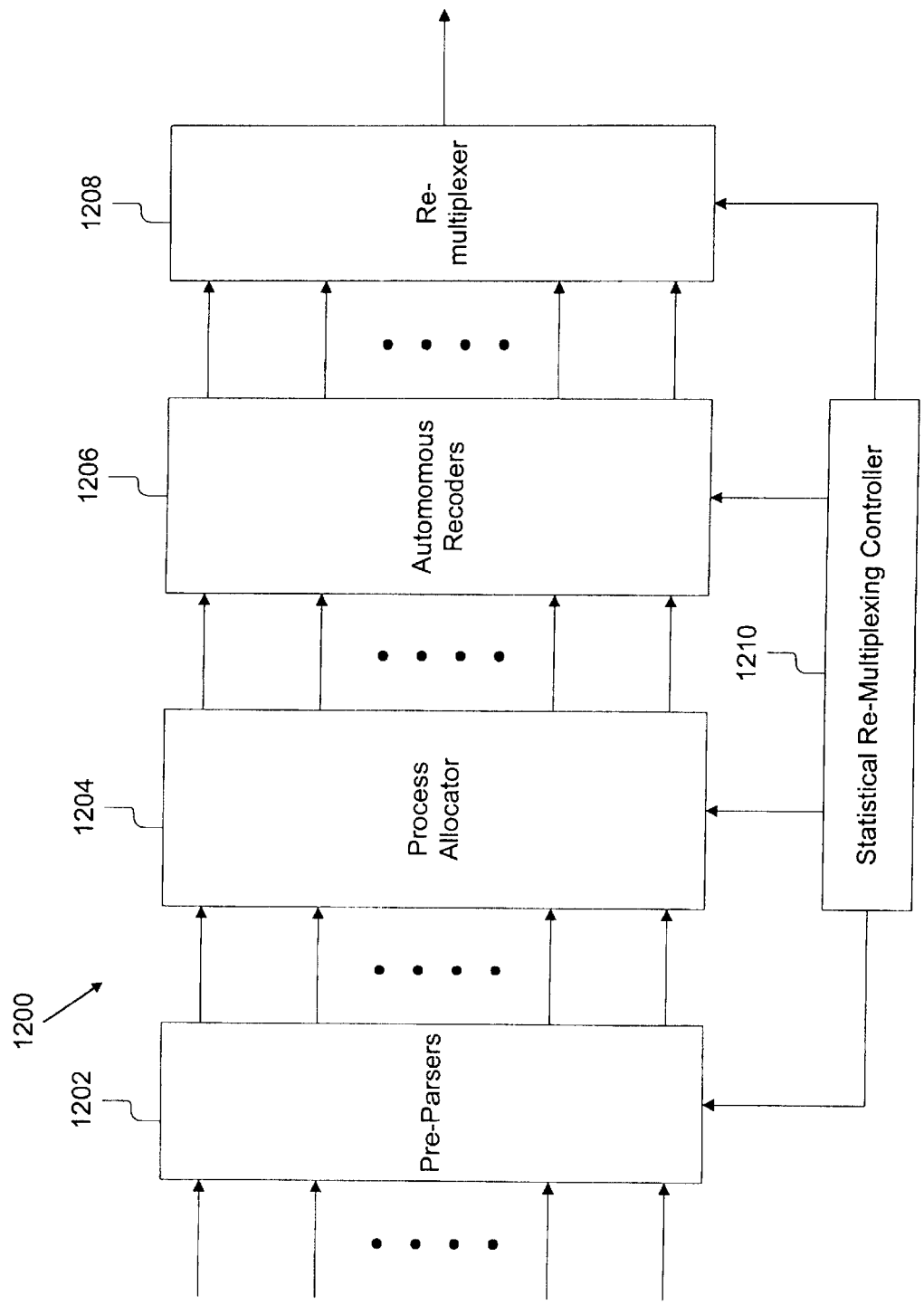

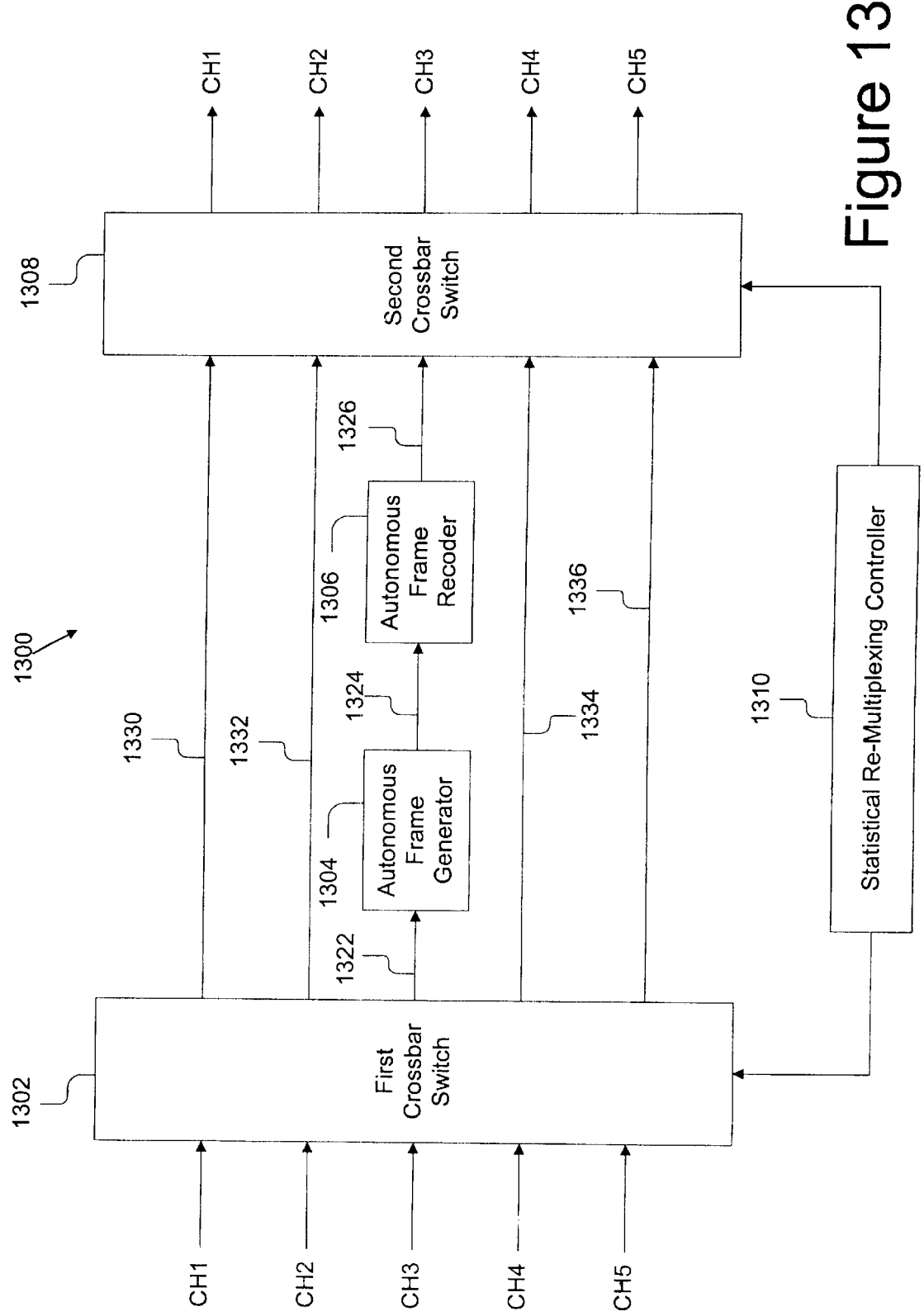

SYSTEM AND METHOD FOR TRANSCODING MULTIPLE CHANNELS OF COMPRESSED VIDEO STREAMS USING A SELF-CONTAINED DATA UNIT

This Application claims the benefit of Ser. No. 60/094,364, filed Jul. 27, 1998.

BACKGROUND OF THE INVENTION

1. Field of the Invention

The present invention relates generally to systems and methods for processing compressed bitstreams of data. In particular, the present invention relates to a system and a method for transcoding video bitstreams on frame and smaller basis. Still more particularly, the present invention relates to a system and method for transcoding multiple channels of compressed video streams using self-contained data units such as autonomous frames wherein such an autonomous frame includes a frame header portion and a frame payload portion.

2. Description of the Related Art

There are presently a variety of different communication channels for transmitting or transporting video data. For example, communication channels such as digital subscriber loop (DSL) access networks, ATM networks, satellite, or wireless digital transmission facilities are all well known. The present invention relates to such communication channels, and for the purposes of the present application a channel is defined broadly as a connection facility to convey properly formatted digital information from one point to another. A channel includes some or all of the following elements: 1) physical devices that generate and receive the signals (modulator/demodulator); 2) physical medium that carries the actual signals; 3) mathematical schemes used to encode and decode the signals; 4) proper communication protocols used to establish, maintain and manage the connection created by the channel. The concept of a channel includes but is not limited to physical channel, but also logical connections established on top of different network protocols, such as xDSL, ATM, wireless, HFC, coaxial cable, etc.

The channel is used to transport a bitstream, or a continuous sequence of binary bits used to digitally represent compressed video, audio or data. The bit rate is the number of bits per second that the channel is able to transport. The bit error rate is the statistical ratio between the number of bits in error due to transmission and the total number of bits transmitted. The channel capacity (or channel bandwidth) is the maximum bit rate at which a given channel can convey digital information with a bit error rate no more than a given value. A video channel or video program refers to one or more compressed bit streams that are used to represent the video signal and the associated audio signals. Also included in the video channel are relevant timing, multiplexing and system information necessary for a decoder to decode and correctly present the decoded video and audio signals to the viewer in a time continuous and synchronous manner. And finally, a multiplex is a scheme used to combine bit stream representations of different signals, such as audio, video, or data, into a single bit stream representation.

One problem with existing communication channels is their ability to handle the transportation of video data. Video data is much larger than many other types of data, and therefore, requires much more bandwidth from the communication channels. Since transmission of digitally sampled video data with existing communication channels would require excessive amounts of time, compression is an approach that has been used to make digital video images more transportable. Digital video compression schemes allow digitized video frames to be represented digitally in much more efficient manner. Compression of digital video makes it practical to transmit the compressed signal by digital channels at a fraction of the bandwidth required to transmit the original signal without compression. International standards have been created on video compression schemes and include MPEG-1, MPEG-2, H.261, H.262, H.263, etc. These standardized compression schemes mostly rely on several key algorithm schemes: motion compensated transform coding (for example, DCT transforms or wavelet/sub-band transforms), quantization of the transform coefficients, and variable length encoding (VLC). The motion compensated encoding removes the temporally redundant information inherent in video sequences. The transform coding enables orthogonal spatial frequency representation of spatial domain video signals. Quantization of the transformed coefficients reduces the number of levels required to represent a given digitized video sample and is the major factor in bit usage reduction in the compression process. The other factor contributing to the compression is the use of variable length coding (VLC) so that most frequently used symbols are represented by the shortest code word. In general, the number of bits used to represent a given image determines the quality of the decoded picture. The more bits used to represent a given image, the better the image quality. The system that is used to compress digitized video sequence using the above-described schemes is called an encoder or encoding system.

In the prior art compression schemes, the quantization scheme is lossy, or irreversible process. Specifically, it results in loss of video textural information that cannot be recovered by further processing at a later stage. In addition, the quantization process has direct effect on the resulting bit usage and decoded video quality of the compressed bit stream. The schemes at which the quantization parameters are adjusted control the resulting bit rate of the compressed bit stream. The resulting bit stream can have either a constant bit rate (CBR) or a variable bit rate (VBR). CBR compressed bit stream can be transmitted over channel delivers digital information at a constant bit rate.

A compressed video bit stream generally is intended for real-time decoded playback at a different time or location. The decoded real-time playback must be done at 30 frames per second for NTSC standard video and 25 frames per second for PAL standard video. This implies that all of the information required to represent a digital picture must be delivered to the destination in time for decoding and display in timely manner. Therefore, this requires that the channel must be capable of making such delivery. From a different perspective, the transmission channel imposes bit rate constraint on the compressed bit stream. In general, the quantization in the encoding process is adjusted so that the resulting bit rate can be accepted by the transmission channel.

Because both temporal and spatial redundancies are removed by the compression schemes and because of variable length encoding, the resulting bit stream is much more sensitive to bit errors or bit losses in the transmission process than if the uncompressed video is transmitted. In other words, minor bit error or loss of data in compressed bit stream typically results in major loss of video quality or even complete shutdown of operation of the digital receiver/decoder.

Further, a real-time multimedia bit stream is highly sensitive to delays. A compressed video bit stream, when transmitted under excessive and jittery delays, will cause the real-time decoder buffer to under flow or overflow, causing the decoded video sequence to be jerky, or causing the audio video signals out of synchronization. Another consequence of the real-time nature of compressed video decoding is that lost compressed data will not be re-transmitted.

Despite the increase in channel bandwidth, there continues to be a need for adjusting the number of bits for representing a bitstream to the amount of available channel bandwidth. Another particular problem, especially when several channels are multiplexed over a single channel, is the allocation of the available bandwidth to multiple channels. Often it is necessary to recode bitstreams to maximize the utilization of the channel bandwidth. However, the use of compression techniques also introduces significant computational complexity into both the encoding and decoding process. Specifically, the compressed video bit streams, at any given bit rate, cannot be altered again to a different bit rate without decoding and recoding. In addition, the resulting number of bits required to represent digital video pictures varies from picture to picture and the coded pictures are highly correlated as a result of motion estimation. The problem of delivering real-time digital video bit stream over a channel of a given bandwidth becomes even more complex because the available bandwidth must be matched to the coded video bit stream rate. When the mismatch occurs, recoding, or re-compression, must be done. A final problem is that existing recoding processes only allow recoding on a stream by stream basis. There are many instances when only a portion of a stream may need to be recoded to resolve a temporary shortage of channel bandwidth.

Therefore, there is a need for a system and method for transcoding a bitstream on a frame or smaller basis. Furthermore, there is a need for a system that allows transcoding on a section of the compressed video data and on an autonomous basis anywhere within a video stream.

SUMMARY OF THE INVENTION

The present invention overcomes the deficiencies and limitations of the prior art with a system and a method for transcoding multiple channels of compressed video streams using autonomous frames. More particularly, a system according to the present invention includes an autonomous frame processing unit having an autonomous frame generator and an autonomous frame recoder. The autonomous frame generator receives video data and divides it into a series of autonomous frames. Each autonomous frame preferably comprises 1) a frame header including all header information from the original video data plus enough additional information to allow the frame to be recoded using pre-defined autonomous frame structure, and 2) a frame payload including the original video data information. The autonomous frame generator outputs autonomous frames to the autonomous frame recoder which in turn process the autonomous frame including extracting processing parameters, extracting the video data and setting up or initializing the recoder to process the extracted video data. The autonomous frame recoder preferably further comprises a parser coupled to an initialization unit and a recoder. The autonomous frame recoder outputs a bitstream that has been adjusted in the number of bits used to represent the data. In other embodiments, the autonomous frame processing unit may include a plurality of autonomous frame generators and a plurality of autonomous frame recoders coupled in a variety of different configurations.

The present invention also includes a method for processing video data including the steps of: receiving a video bitstream, storing recoding information, dividing the video bitstream into a plurality of autonomous frames each frame including a portion of the video bitstream and recoding information, outputting the plurality of autonomous frames, receiving the plurality of autonomous frames, extracting processing information from the autonomous frame, extracting video data from the autonomous frame, setting the recoding according to the processing information and recoding the extracted video data.

BRIEF DESCRIPTION OF THE DRAWINGS

FIG. 12 is a block diagram of a first statistical re-multiplexer using autonomous frame processing according to the present invention.

FIG. 13 is a block diagram of a second statistical re-multiplexer using autonomous frame processing according to the present invention.

DETAILED DESCRIPTION OF THE PREFERRED EMBODIMENTS

While the present invention will now be described with particularity for the handling of MPEG-2 digital video compression, those skilled in the art will recognize that the principles of the present invention may be applied to a variety of other related video compression schemes such as the H.26X video conference signals. Specifically, the present applications discloses a technique of adding and processing autonomous frames that can be used to selectively perform recoding. Furthermore, those skilled in the art will recognize that the bit streams discussed below are unscrambled. This allows direct access to all the bitstream content for rate reduction, recoding, and timing re-stamping. In cases where the bitstreams are scrambled, they first need to be unscrambled, spliced and then re-scrambled.

System Overview

Figure 1:
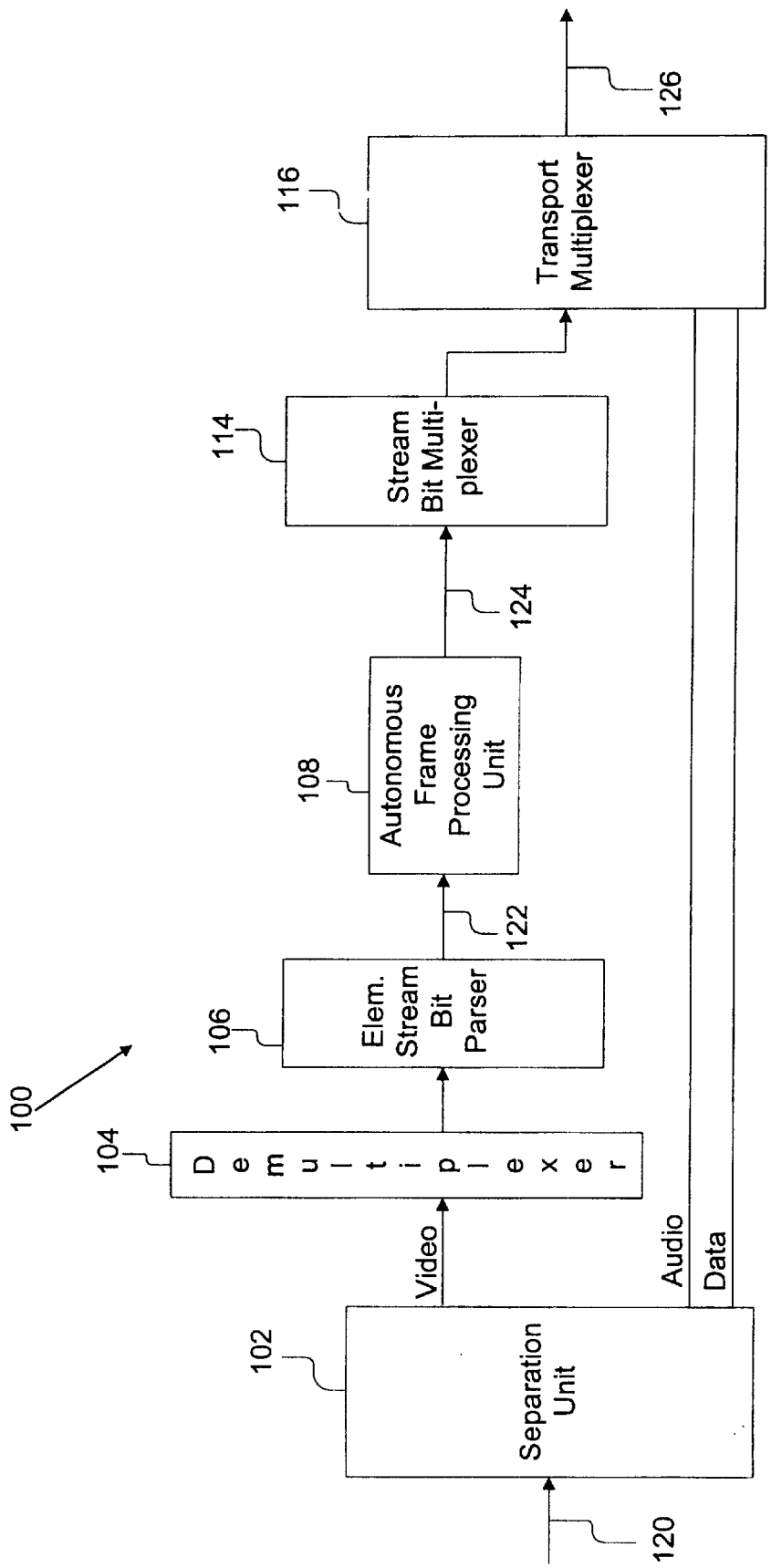
FIG. 1 is a block diagram of a transcoding system including the autonomous frame processing unit of the present invention.

Referring now to FIG. 1, a preferred embodiment of a system 100 constructed according to the present invention and including an autonomous frame processing unit 108 is shown. The system 100 is adapted for use on an MPEG-2 transport stream. The preferred embodiment of the system 100 preferably comprises a separation unit 102, a de-multiplexer 104, an elementary stream bit parser 106, the autonomous frame processing unit 108, a stream bit multiplexer 114, and a transport multiplexer 116.

The separation unit 102 has an input coupled to line 120 and receives an MPEG-2 transport stream. The separation unit 102 preferably de-multiplexes the system layer stream, removing filler packets/frames as appropriate, to obtain the video bit stream, the audio bit stream and a data bit stream. The video bit stream is provided on a first output, the audio bit stream is provided on a second output, and a data bit stream is provided on a third output. Those skilled in the art will understand the operation of the separation unit 102, based on the protocol being used for the bit stream. Based on the protocol, the bit stream can be divided into the sub-streams according to the present invention. The audio stream and data stream are output directly to the transport multiplexer 116 which recombines these streams with the recoded or processed video. Even though a compressed bit stream typically includes a multiplex of compressed audio, video and auxiliary data bit streams, recoding process in the present invention refers only to the process applied to compressed video bit stream.

The de-multiplexer 104 is coupled to receive the video stream from the separation unit 102. The de-multiplexer 104 extracts a video elementary stream payload from the video transport stream and in turn sends the video elementary stream payload to the elementary stream bit parser 106. The elementary stream bit parser 106 receives the output of the de-multiplexer 104 and divides it into access units that can include one or more of a transform coefficient component, a motion vector component, and an auxiliary information component. The access units are provided on line 122 and sent to the autonomous frame processing unit 108.

The autonomous frame processing unit 108 preferably has an input and output. The input of the autonomous frame processing unit 108 is coupled to the output of the elementary stream bit parser 106 to receive access units. The autonomous frame processing unit 108 receives video data and divides it into a series of autonomous frames and performs recoding on the autonomous frames. Each autonomous frame preferably comprises 1) a frame header including picture header information from the original video data plus enough additional information to allow the frame to be recoded, and 2) a frame payload including the original video data picture information. The autonomous frame processing unit 108 recodes the video data on an autonomous frame to generate and video transport stream. The output of the autonomous frame processing unit 108 is coupled by line 124 to the stream bit multiplexer 114.

The stream bit multiplexer 114 essentially performs an inverse function of the de-multiplexer 104, and combines the output of the autonomous frame processing unit 108 with other information to re-form the video bitstream. The output of the stream bit multiplexer 114 is coupled to an input of the transport multiplexer 116 along with the audio and data signals from the separation unit 102. These signals are then combined by the transport multiplexer 116 and output on line 126. Those skilled in the art will recognize from FIG. 1 that the present invention can be applied to bit stream based on other transform schemes.

MPEG-2 Bit Stream Syntax

As has been noted above, the present invention is described in detail with reference to the syntax used in MPEG-2, but the concept of an autonomous frame applies to any number of video transport and compression schemes. In the following sections, the present invention is disclosed in the context of recoding of MPEG-2 bit streams, whether it is transport stream, program stream, PES stream or elementary stream. This section provides brief overview of the MPEG-2 bit stream syntax for convenience and ease of understanding of the concept in the present invention. MPEG-2 compression standard consists of two layers of information: the video or audio layer and the system layer. The video layer includes the elementary stream (ES) layer. This layer defines how compressed video (or audio) signals are sampled, motion compensated, transform coded, quantized, and represented by different variable length coding (VLC) tables. The recoding (or transcoding) of pre-compressed MPEG-2 bit streams is a process in which the bit stream signal is redefined in this layer.

The system layer is defined to allow the MPEG-2 decoder to correctly decode audio and video signals, present the decoded result to the video screen in a time continuous manner. The system layer also includes provisions that allow unambiguous multiplexing and separate of audio and video compressed signals, and different channels of audio and video compressed signals. The system layer consists of two sub-layers. The first layer is the PES layer, this layer defines how the ES layer bit stream is encapsulated into variable length packets, called PES packets. In addition, presentation and decoding time stamps (PTS/DTS) are added to the PES packets. There are two different sub-layers above the PES layer, the transport layer and program system layer.

The transport layer defines how the PES packets are further packetized into fixed sized transport packet of 188 bytes. Additional timing information and multiplexing information are added to the transport layer. The resulting stream of transport packets is called transport stream. Transport stream is optimized for use in environments where errors are likely, such as storage or transmission in lossy or noisy media. Typical application of transport stream includes Direct Broadcast Service (DBS), digital or wireless cable services, broadband transmission systems, etc.

The program system layer defines how the PES packets are encapsulated into variable size packets. Additional timing and multiplexing information are added to the program system layer. The program stream is designed for use in relatively error-free environments and is suitable for applications that may involve software processing of system information such as interactive multimedia applications. A typical application of program stream includes Digital Versatile Disks (DVD) and video servers.

In general a video bit stream can be in elementary stream (ES) format, which means that no PES, transport or program system layer information is added to the bit stream. The video bit stream can also be represented in the form of PES stream, transport stream or program stream. For a given video bit stream, the difference between these different bit stream represented in the different layers lies in the timing information, multiplexing information and other information not directly related to the recoding process. The information required to perform recoding, however, is contained in the elementary stream layer.

The discussion below on recoding is, therefore, not limited to bit streams in any one of the layers. In other words, the discussion on how to recoding bit streams in one layer, say in elementary stream layer, can be straightforwardly extended to PES stream, transport stream or program streams as well, by properly taking additional layering information into considerations, even though the elementary stream layer is the focus as shown in FIG. 1.

Autonomous Frame Data Structure

The present invention advantageously creates a new concept of an autonomous frame data structure. The autonomous frame is a scheme for partitioning the compressed video bit stream such that each unit or autonomous frame, as a result of the partitioning, forms a self-contained data unit that can be recoded. Below the partitioning of the coded video bit stream is defined to achieve this object. While the discussion focuses on the coding of MPEG-2 elementary stream, the "autonomous frame" concept described here can be applied to other compressed video bit streams as well.

An autonomous frame is a data unit constructed based on a subsection of the compressed video bitstream that contains all of the information necessary to recode this data unit without using any additional information. Specifically, the data unit contains all the information required for the recoder to initialize itself and operate on the data unit. An autonomous frame is defined as consisting of the following two key components: a frame header (AFH) and frame payload (AFP). The autonomous frame is preferably derived from a subsection of the original compressed video bitstream, includes an associated recoding method, and has the information contained in the frame header of an autonomous frame sufficient to initialize the recoder to perform autonomous recoding. It is important to point out that a recoding scheme must be defined together with the autonomous frame data structure. For example, an autonomous frame, when used as input to a recoder which is not defined with the autonomous frame will not necessarily make the recoding process autonomous, and vice versa. In other words, the recoding method and the type in the autonomous frame are coupled and must match for recoding to be properly performed.

Figure 8:
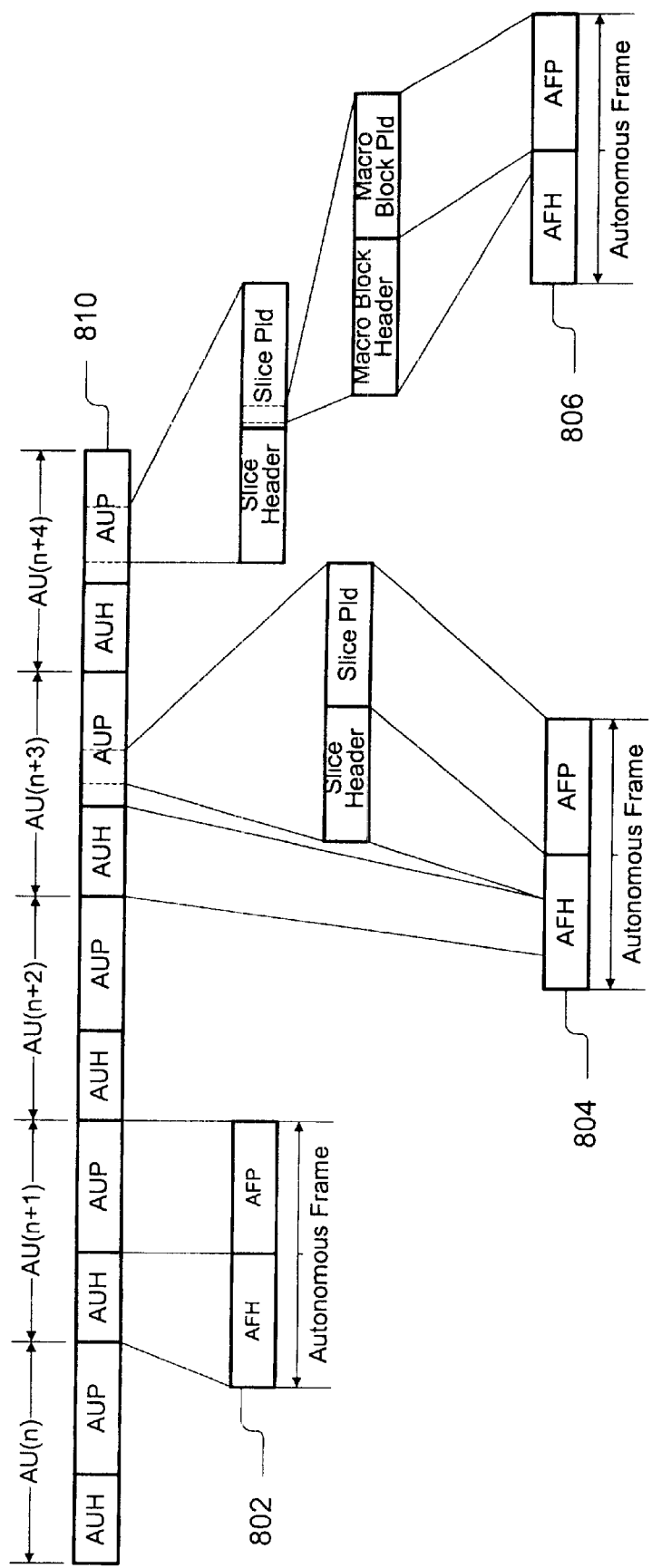
FIG. 8 is a block diagram illustrating several exemplary embodiments for an autonomous frame based on an access unit (AU), a splice and a macro block.

Referring now to FIG. 8, one embodiment 802 for the autonomous frame adapted for use in processing an MPEG2 video bit stream is shown. This autonomous frame implementation is defined as a data unit of coded picture without using the data from other coded pictures. In addition, requantization is assumed to be the method of re-encoding. For MPEG-2 video bit stream, each autonomous frame is advantageously constructed around the boundary of the so called access unit (AU) defined according to the MPEG-2 standard. For MPEG-2, the present invention defines an access unit (AU) as all the coded data for a picture, and any stuffing that follows it, up to but not including the start of the next access unit. If a picture is not preceded by a group_start_code or a sequence_header_code, the access unit begins with the picture start code or picture_header. If a picture is preceded by a group_start_code and/or a sequence_header_code, the access unit begins with the first byte of the first of these start codes. If it is the last picture preceding a sequence_end_code in the bit stream all bytes between the last byte of the coded picture and the sequence_end_code (including the sequence_end_code) belong to the access unit.

In terms of the syntax of MPEG-2 video bit stream, an access unit (AU) is defined in the video elementary stream layer 810 and is shown in the following table.

TABLE 1

| Access Unit Header (AUH) | sequence_header | Optional |
|---|---|---|
| | sequence_extension | |
| | sequence_user_data | |
| | GOP_header | Optional |
| | user_data | |
| | picture_header | |
| | picture_extension | |
| | extension_user_data | |

TABLE 1-continued

| Access Unit Payload (AUP) Picture Data | slice 0x101 ... slice 0x1XX |
|---|---|

However, it is straightforward to map the access unit information to the upper layer packets, such as PES or transport packets. There may be cases when a transport or PES packet contains bits from two or more access units, in which case only the bits of the access unit under discussion is considered and all bits belonging to other access units are ignored. For convenience all data bits in an access unit immediately before the slice start code 0x101 but after the end of the picture data are defined as access unit header (AUH) bits. The rest of the bits of an access unit are defined to be the access unit payload (AUP) bits. The AUH contains information that is used to assist the decoding process and is maintained until being updated by the AUH contents from the next access unit. Some of the information bits in AUH must be used to perform the recoding process and thus must be available to the recoder.

For MPEG-2, the present invention defines the self contained data structure, called an autonomous frame, to include a frame header (AFH) and frame payload (AFP), as noted above. The autonomous frame header (AFH) includes an updated version of AUH and additional auxiliary information used to assist the recoding process. For example, such auxiliary information preferably includes a bit budget per picture (target bit usage of x bits), presentation and display time stamps, length of the frame in byte or packet, etc. The auxiliary information bits include all the information to perform recoding of the access unit. In other words, the AFH can be considered list of all global variables and their values that may be needed for recoding. Again, it is important to point out that the particular recoding technique described in FIG. 4 for recoder 408 is assumed to be requantization. This approach advantageously does not require the use of reference coded pictures.

The autonomous frame payload (AFP) is preferably the same as the AUP, but may be different. The AUP does not exclude the scenario when all elementary stream bits are contained as part of the PES or transport packets. In this case, all information contained in the transport packet header fields are not considered part of AUP. It is important to point out that AFP described above may be interpreted as other than a copy of the AUP. When the access unit is in packetized form of the upper layer syntax, the associated upper layer system information may also be carried forward into the autonomous frame payload. To make the concept easier to explain, we limit our discussion to the access unit in its elementary stream form, and the assumption that the AUP is the same as the AFP.

The relationship of the autonomous frame to the access unit is best illustrated in FIG. 8. In order the construct the autonomous frame 802, a parsing process is used to obtain the frame header. Specifically, the auxiliary information contained in the frame header is derived not from the latest access unit only, but from all of the access unit headers of all previous access units, up to and including the current access unit. A processing unit, called the pre-parser, must be used to generate the autonomous frame as will be discussed below. The pre-parser extracts the AUH information collected so far from all of the access units and uses it to update and set the proper fields in the auxiliary information data section of the autonomous frame. Once the AFH is created the AFP which is the video data from the original bit stream is added to create the autonomous frame 802.

Those skilled in the art will recognize that the autonomous frame concept is not limited to a mapping between access units and autonomous frames, but could occur at a variety of other levels to provide any level of partitioning of a video bitstream. Two alternate embodiments 804, 806 for the autonomous frame are also shown in FIG. 8. The other embodiments 804, 806 of the autonomous frame define the frame boundary to coincide with smaller data units within an access unit. For example, the autonomous frame 804 has an AFH that includes the auxiliary information, but information from the AUH and the slice header as graphically depicted. The AFP for the autonomous frame 804 includes only a portion of the data from the AUP, namely, the slice payload. A similar embodiment on a finer level of granularity is shown as autonomous frame 806 where the AFH includes the auxiliary information, information from the AUH, the slice header and the macro block header, and the AFP includes the macro block payload. The autonomous frame may be alternatively defined to be one autonomous frame per multiple macro blocks, one autonomous frame for any contiguous section of a coded picture, or a variety of other embodiments for any desired level of granularity, along with the associated appropriate recoding scheme.

Autonomous Frame Processing Unit

Figure 2:
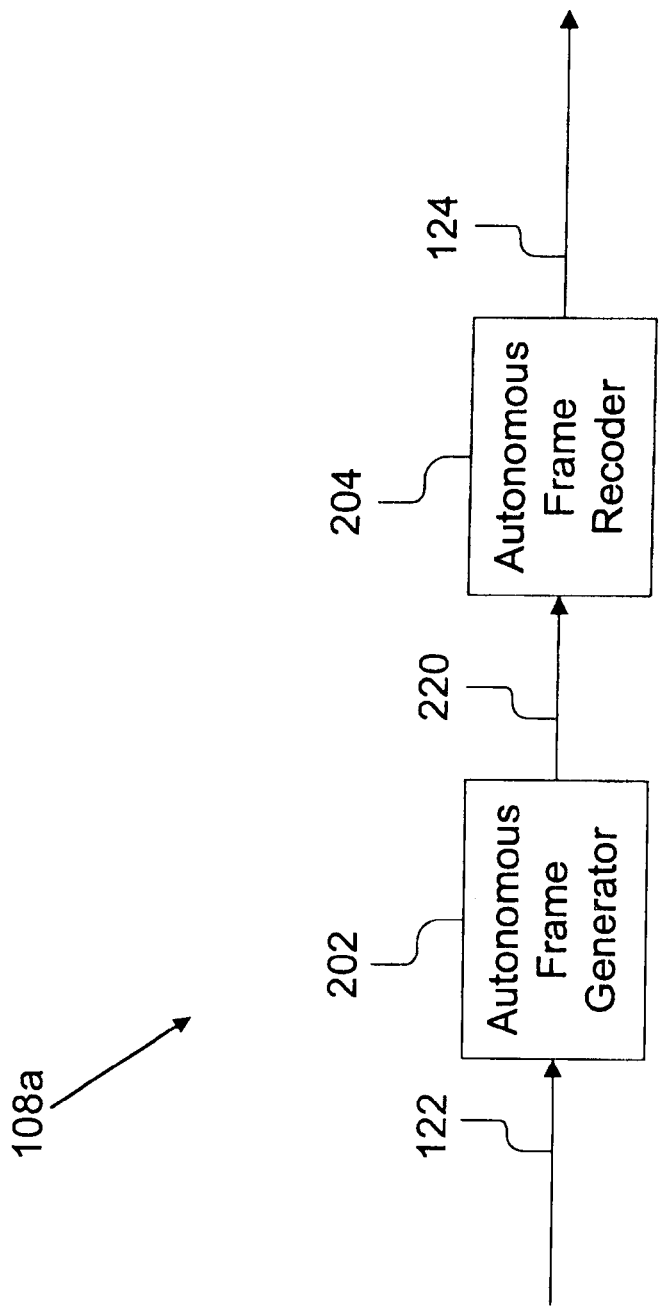
FIG. 2 is a block diagram of a first and preferred embodiment for the autonomous frame processing unit of the present invention.

Referring now to FIG. 2, the first and preferred embodiment for the autonomous frame processing unit 108a of the present invention is shown in more detail. The autonomous frame processing unit 108a preferably comprises an autonomous frame generator 202 and an autonomous frame recoder 204. The autonomous frame generator 202 receives video data and divides it into a series of autonomous frames 802 as described above with reference to FIG. 8. The autonomous frame generator 202 produces autonomous frames 802 from the input video signal and outputs the frames to the autonomous frame recoder 204 via line 220. The autonomous frame generator 202 will be described in more detail with reference to FIG. 3. The autonomous frame recoder 204 in turn processes the autonomous frames 802 including extracting processing parameters, extracting the video data and setting up or initializing a recoder to process the extracted video data. The autonomous frame recoder 204 will be described in more detail with reference to FIG. 4. The autonomous frame recoder 204 outputs a bitstream that has been adjusted in the number of bits used to represent the data on line 124.

Figure 3:
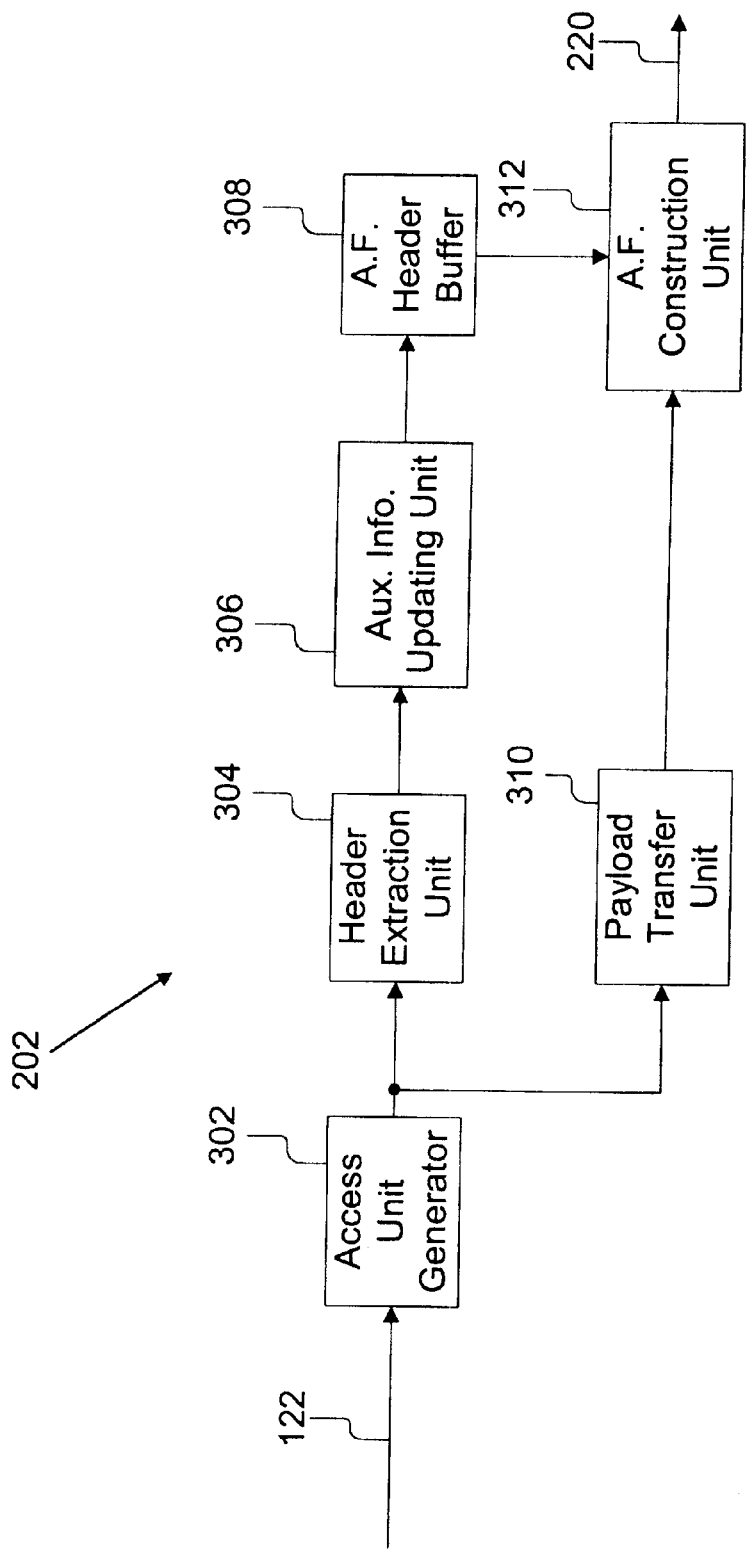
FIG. 3 is a block diagram of a first embodiment for the autonomous frame generator of the present invention.

Referring now to FIG. 3, a preferred embodiment for the autonomous frame generator 202 of the present invention is shown. The autonomous frame generator 202 preferably comprises an access unit generator 302, a header extraction unit 304, an auxiliary information updating unit 306, an autonomous frame header buffer 308, a payload transfer unit 310, and an autonomous frame construction unit 312. The autonomous frame generator 202 is particularly advantageous because is receives a video bitstream and converts the bitstream into a plurality of autonomous frames that can be processed independently by the autonomous frame recoder 204. For example, the autonomous frames can be processed one at a time in sequence as describe with reference to FIG. 4 or many at a time as will be described in other embodiments. The partitioning of the bitstream into autonomous frame that can be independently processed allows the frames to be processed in any number of ways, therefore making the present invention fully scaleable and flexible.

The autonomous frame generator 202 has an input coupled to line 122 to receive transport packets, for example, in MPEG-2 format. The input of autonomous frame generator 202 is formed by the input of the access unit generator 302. The access unit generator 302 receives the packets at the transport layer and converts them to access units as described above with reference to FIG. 8. In an exemplary embodiment, this could be the same as de-multiplexer 104. The packets on the transport layer are divided into a transport header and a transport payload to form a unit of convenient size for transmission over the channel. The packets on the transport layer are received by the access unit generator 302 and reformatted into access units including an AUH and AUP. The access unit generator 302 uses the one or more transport headers to reformat the transport payloads into AU having an AUH and AUP, and then outputs the AU. The transport headers are discarded once the AUs have been generated.

The output of the access unit generator 302 is provided as an input to both the header extraction unit 304 and the payload transfer unit 310. The payload transfer unit 310 is similar to the header extraction unit 304, but processes the AUs to generate the AUP. In the simplest embodiment, the payload transfer unit 310 receives an AU and identifies the picture data (as shown in Table 1) and outputs the picture data as the frame payload. For the case of MPEG-2 video bitstream, the frame payload is preferably a subsection of the MPEG-2 video bitstream, in the form of either elementary stream, PES stream, transport stream or program stream. The output of the payload transfer unit 310 is coupled to an input of the autonomous frame construction unit 312 to provide the AUPs for joining with the AFH to form an autonomous frame.

The header extraction unit 304 receives the AU and extracts the AUH from the AU. The header extraction unit 304 acquires the data from the AUH that is used to create the AFH. The AUH for MPEG-2 may have one of three formats. First, the AUH may include only the picture_header, the picture_extension and the extension_user_data. In such case, the header extraction unit 304 determines these three values from the AUH and outputs them. Second, the AUH may include the GOP_header, user_data, picture_header, the picture_extension and the extension_user_data. In this second case, the header extraction unit 304 determines these five values from the AUH and outputs them. Finally, the AUH may include a sequence_header, a sequence_extension, sequence_user_data, the GOP_header, user_data, picture_header, the picture_extension and the extension_user_data. In this case all the values are determined and output by the header extraction unit 304. These values will be used in turn by the autonomous frame construction unit 312 to create the autonomous frame. Thus, the header extraction unit 304 provides the auxiliary information which for the case of MPEG-2 video bit stream, may include some or all of the following: a sequence header, a sequence extension, an extension and user data, a group of picture header, a picture header and a picture coding extension.

The output of the header extraction unit 304 is coupled to the input of the auxiliary information updating unit 306. The auxiliary information updating unit 306 also has a data and control outputs coupled to the autonomous frame header buffer 308. The auxiliary information updating unit 306 maintains and keeps the autonomous frame header buffer 308 current. As additional auxiliary information is extracted from each received AU by the header extraction unit 304, the auxiliary information updating unit 306 stores the new information in the autonomous frame header buffer 308. The auxiliary information updating unit 306 also receives signals from a recoding algorithm controller/selector indicating the recoding method used, the desired bit budget for this picture and other information not available from the current or previous AUH, but needed for recoding. The auxiliary information updating unit 306 is also responsible for managing the data in autonomous frame header buffer 308 since there may be auxiliary information for a number of streams stored in the autonomous frame header buffer 308.

The autonomous frame header buffer 308 is any one of a variety of conventional buffers and is used to store the data necessary for re-encoding any given picture. The autonomous frame header buffer 308 is preferably sized to hold the auxiliary information for a plurality of bitstreams. The autonomous frame header buffer 308 preferably stores a current list of values for the sequence_header, a sequence_extension, sequence_user_data, the GOP_header, user_data, picture_header, the picture_extension and the extension_user_data for each stream. The autonomous frame header buffer 308 also stores other auxiliary information required by a re-encoder to process the AFP. The autonomous frame header buffer 308 is coupled to both the auxiliary information updating unit 306 and the autonomous frame construction unit 312.

The autonomous frame construction unit 312 is coupled to the autonomous frame header buffer 308 to receive data for generating the AFH and to the payload transfer unit 310 to receive the data used to form the AFP. The autonomous frame construction unit 312 basically packages the auxiliary information retrieved from the autonomous frame header buffer 308 into the autonomous frame header (AFH), once per access unit. All information needed to describe the state of the recoder for it to perform recoding is retrieved and stored as the AFH. The autonomous frame construction unit 312 then transfers the bitstream subsection of the AUP into the AFP. Thus, an autonomous frame is created and output on line 220.

Figure 4:
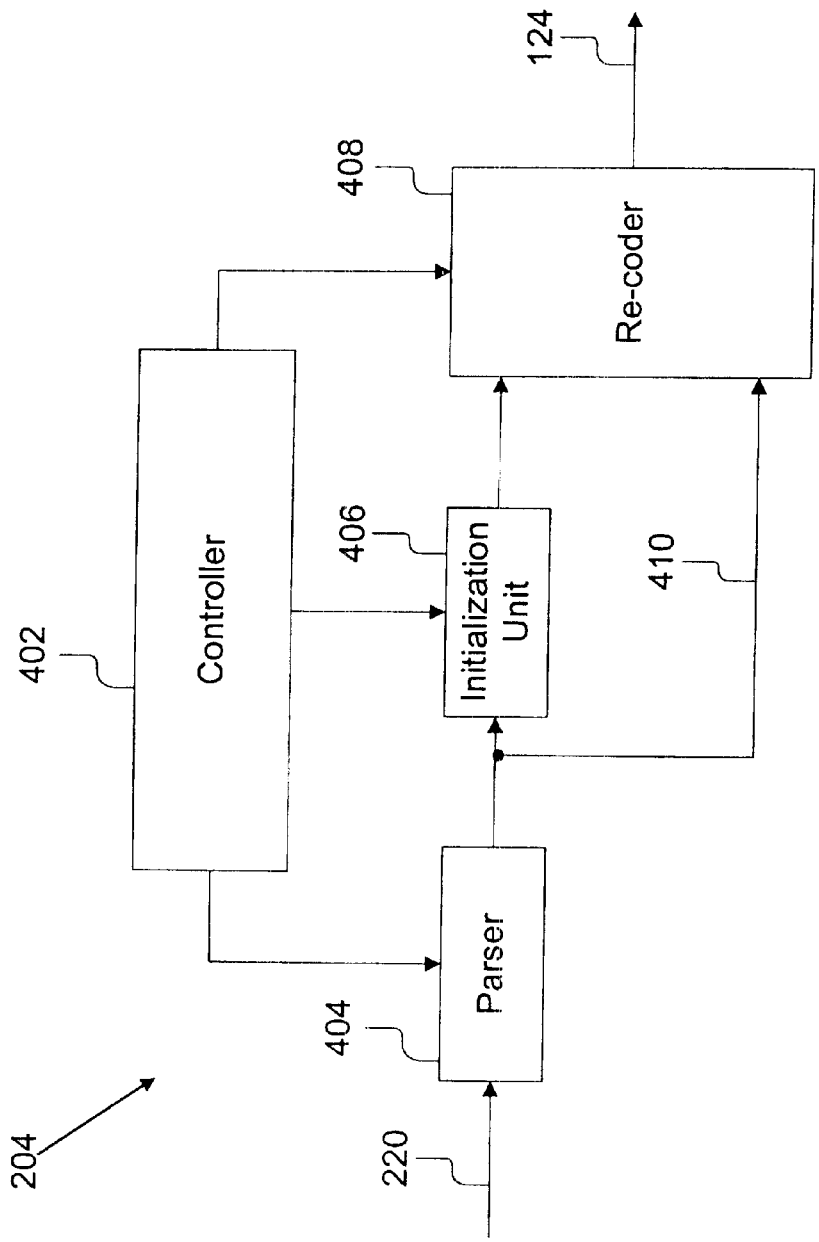
FIG. 4 is a block diagram of a first embodiment for the autonomous frame recoder of the present invention.

Referring now to FIG. 4, a preferred embodiment for the autonomous frame recoder 204 of the present invention is shown. The autonomous frame recoder 204 comprises a parser 404, an initialization unit 406 and a recoder 408 operating under the direction of a controller 402. The autonomous frames are designed to allow autonomous recoding. Specifically, the autonomous frame recoder 204 of the present invention is one that can re-encode the access unit of compressed video elementary stream in an entirely self-contained manner. In other words, the information contained in the frame header of an autonomous frame is sufficient for the system to perform the re-encoding without any external input. The parser 404 has a data input, a data output and a control input. The data input of the parser 404 is coupled to line 220 to receive autonomous frames from the autonomous frame generator 202. The parser 404 receives the autonomous frames, separates the AFH and AFP, and outputs corresponding AFHs and AFPs on line 410 such that each portion of the autonomous frame is identified for later processing. The output of the parser 404 is coupled to an input of the initialization unit 406 and a data input of the re-encoder 408. The initialization unit 406 identifies the AFH, and extracts the content in the frame header including the auxiliary information and the AUH. This content is output by the initialization unit 406 and input to a control input of the re-encoder 408. The content is used to initialize the re-encoder 408. The re-encoder 408 is initialized, and as a result of this initialization, the re-encoder 408 is set to a state just as if it had completed the decoding of the last access unit prior to this access unit. The recoder 408 also has the data input coupled to the output of the parser 404. The recoder 408 performs the recoding processing using the AUP as input. At the data input, the recoder 408 disregards the AFHs and only process the AFPs. The recoder 408 then outputs a bitstream which may be an elementary stream, packetized elementary stream (PES), transport, or an autonomous frame. The controller 402 is coupled to control the parser 404, the initialization unit 406 and the recoder 408 to coordinate and control the operation of the above mentioned components. For example, the recoder 408 cannot start recoding until the parser 404 has completed parsing by extracting and providing the auxiliary information and the initialization unit 406 has properly set the recoder's states. Once the initialization is complete, the controller disconnects the recoder 408 from the initialization unit 406 and performs the recoding using the input on 410.

The recoder 204 is particularly advantageous because it provides autonomous operation by virtue of fact that the recoder 408 can perform the operation completely independently of the processing done on the previous and next access units. This capability allows several flexible implementations of the recoding as will be described in detail below. Again, while the present invention is discussed in the context of processing of MPEG-2 video elementary streams, the same techniques, with minor modifications, can be applied to the processing of MPEG-2 transport streams, MPEG-2 PES, MPEG-2 program streams, MPEG-1 streams, or H.26x based video conferencing signals. Other additional information and protocol data units, such as MPEG-2 transport stream over ATM protocols, layered on top of the above signals can also be handled similarly.

Figure 5:
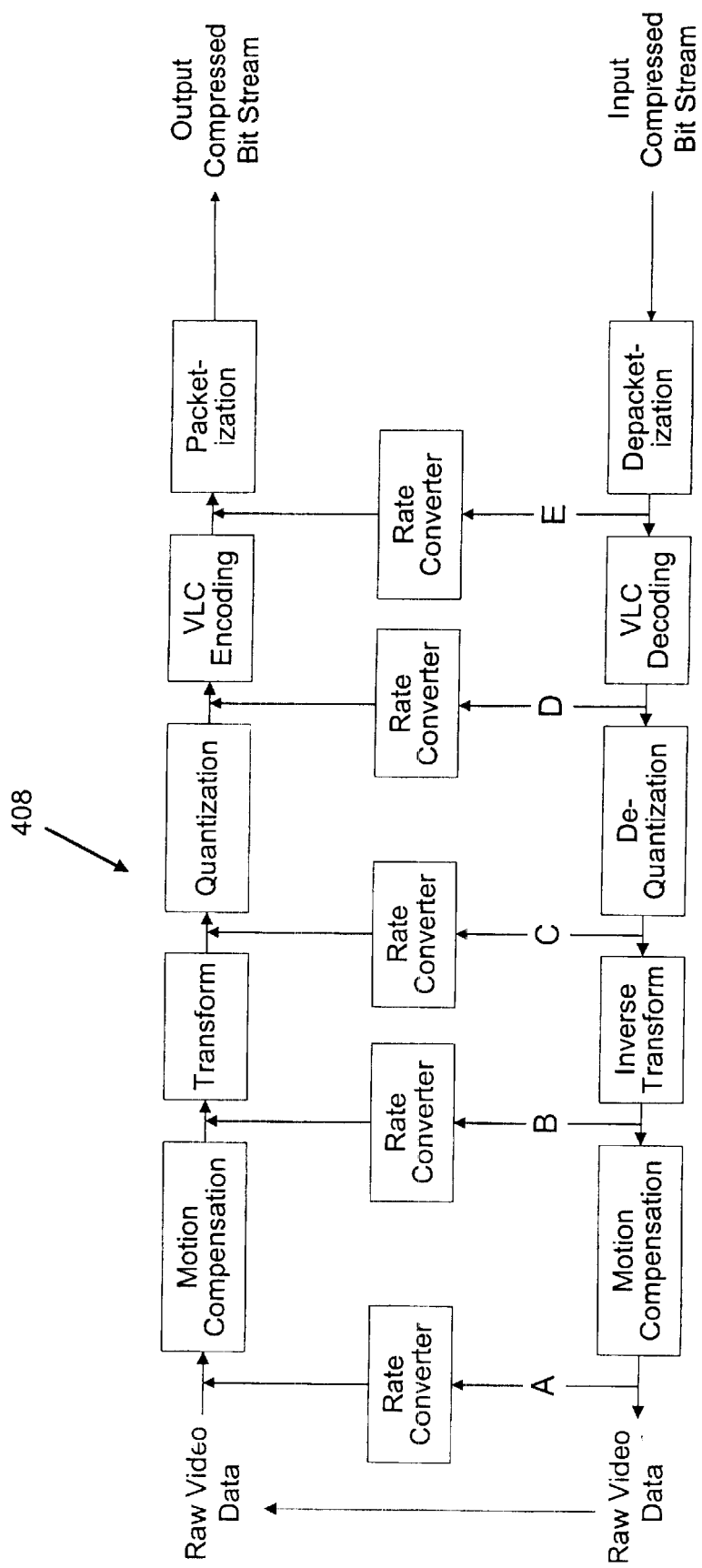
FIG. 5 is a block diagram of an exemplary embodiment for the recoder of FIG. 4.

For the present invention, recoding is defined in its broadest sense to include partial decoding, recoding, re-quantization, re-transforming, and complete decoding and recoding. Referring now to FIG. 5, each of these type of recoding are defined with more particularity. FIG. 5 is used to show various possibilities for the recoder 408. Some of the elements shown may also be needed for decoding and encoding of the video data. Hence in actual implementation, these common elements may be shared between the recoder 408 and the decoder/encoder. Partial decoding refers to path E where the bitstream is partially decoded, decode system syntax, and video syntax down to the picture header to perform frame accurate flexible splicing. Recoding refers to path D where variable length encoding and decoding are performed and the DCT coefficients may be truncated to zero without even going through the inverse quantization steps. This approach requires the least processing, but in general causes the greatest amount of quality degradation. Re-quantization refers to path C where variable length encoding, de-quantization, quantization and decoding are performed but no transform coding is used. The transform coefficients (DCT coefficients) are requantized before VLC encoded back. This is the approach preferably used for the recoder 408. Re-transformation refers to path B where variable length encoding, de-quantization, inverse transform, transform coding, quantization and decoding are performed. The video frames are constructed without using motion compensation. In the case of B or P pictures, this would mean some of the coded blocks are motion estimated residual errors. Some form of spatial filtering may be used before forward transform coding is used in the encoding process. Recoding refers to path A where the bitstreams are complete decoded to raw video and then encoded including the use of motion compensation. Each of the paths A, B, C, D, E includes a rate converter for adjusting the rate of the bitstream to ensure buffer compliance. Each of the rate converters may be different. For example, the rate converter on path A may be a spatial filter and the rate converter on path C may perform a quantization step size adjustment while the rate converter on path D performs high frequency elimination. Those skilled in the art will also recognize that the components of the recoder 408 used (e.g., the path through the recoder 408) could also be variably controlled to provide variable bit rate conversion using the recoder 408. In various embodiments, the recoder 408 may include all, only some or any combination of these components according to which of recoding, re-quantization, re-transforming and recoding is performed.

More specifically, the recoder 408 preferably performs only requantization, and thus, follows path C through the rate converter. The inverse transform, motion compensation, motion estimation, transform and additional rate converters on paths A, B, D, and E are therefore not required according this embodiment. However, in alternate embodiments, the recoder 408 may perform any level of recoding provided by paths A through E. Generally, motion compensation is most computationally expensive, transform coding and inverse transform coding are also quite expensive. For example, in FIG. 5, if we take the path B, motion compensation is avoided. If we take path C, both motion compensation and transform coding are eliminated. If we take path D, quantization steps are also eliminated, in addition to motion compensation and transform coding. Of course, path A performs the entire decoding and encoding processes are performed, resulting in the most flexibility and quality potential, at the cost of being most expensive.

Figure 6:
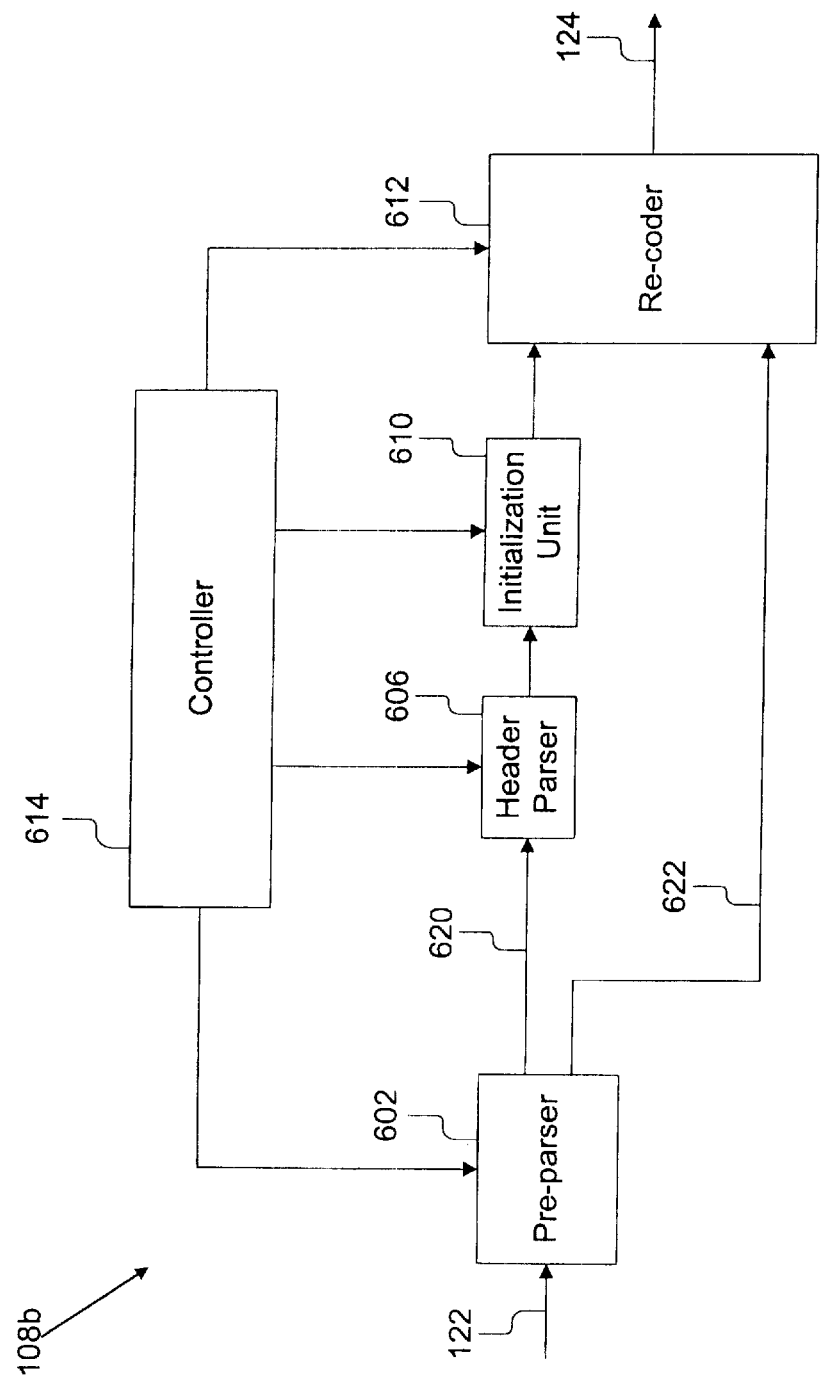
FIG. 6 is a block diagram of a second embodiment for the autonomous frame processing unit of the present invention.

Referring now to FIG. 6, a block diagram of a second embodiment for the autonomous frame processing unit 108b of the present invention is shown. The second embodiment of the autonomous frame processing unit 108b preferably comprises a pre-parser 602, a header parser 606, an initialization unit 610, and a recoder 612. The pre-parser 602 has an input coupled to line 122 to sequentially receive a plurality of access units. The pre-parser 602 has a plurality of outputs coupled to line 620 and 622, respectively. The pre-parser 602 is used to convert access units to autonomous frames. The pre-parser 602 is used to generate a logical autonomous frame and outputs the AFH on line 620 and the AFP on line 622. Line 620 is coupled to the header parser 606. The header parser 606 extracts the content in the frame header including the auxiliary information and the AUH. The header parser 606 outputs the auxiliary information and the AUH to the initialization unit 610. The initialization unit 610 applies the auxiliary information and the AUH to the recoder 612 to initialize the recoder 612. Again, the recoder 612 is set to a state just as if it had completed the decoding of the last access unit prior to this access unit. The recoder 612 is a similar type to that disclosed above with reference to FIG. 5.

The controller 614 shown in FIG. 6 coordinates the operation of the pre-parser 602, the header parser 606, the initialization unit 610, and the recoder 612. At the input of each new autonomous frame, the controller 614 first disables the operation of the header parser 606, the initialization unit 610, and the recoder 612. It then enables the pre-parser 602 to generate the autonomous frame and separate the frame into AFH and AFP. Next, the controller 614 enables the header parser 606 to accept the AFH from the pre-parser 602. After that, the controller 614 sends the output of header parser 606 to the initialization unit 610. The controller 614 then disables the header parser 606 and enables the initialization unit 610. In this phase, the initialization unit 610 resets the operation of recoder 612 and initializes it with the values obtained from the header parser 606. In the last phase, the controller 614 enables the operation of recoder 612 and disables the header parser 606 and the initialization unit 610.

At this phase, the recoder 612 functions as if it has been processing a continuous flow of bitstream up to this point, with all parameters needed for the decoding updated. Therefore, the key function of the controller 614 is to ensure the recoder 612 does not start processing before the header parser 606 and the initialization unit 610 have completed their processing of the autonomous frame header and have properly initialized the recoder 612.

Figure 7:
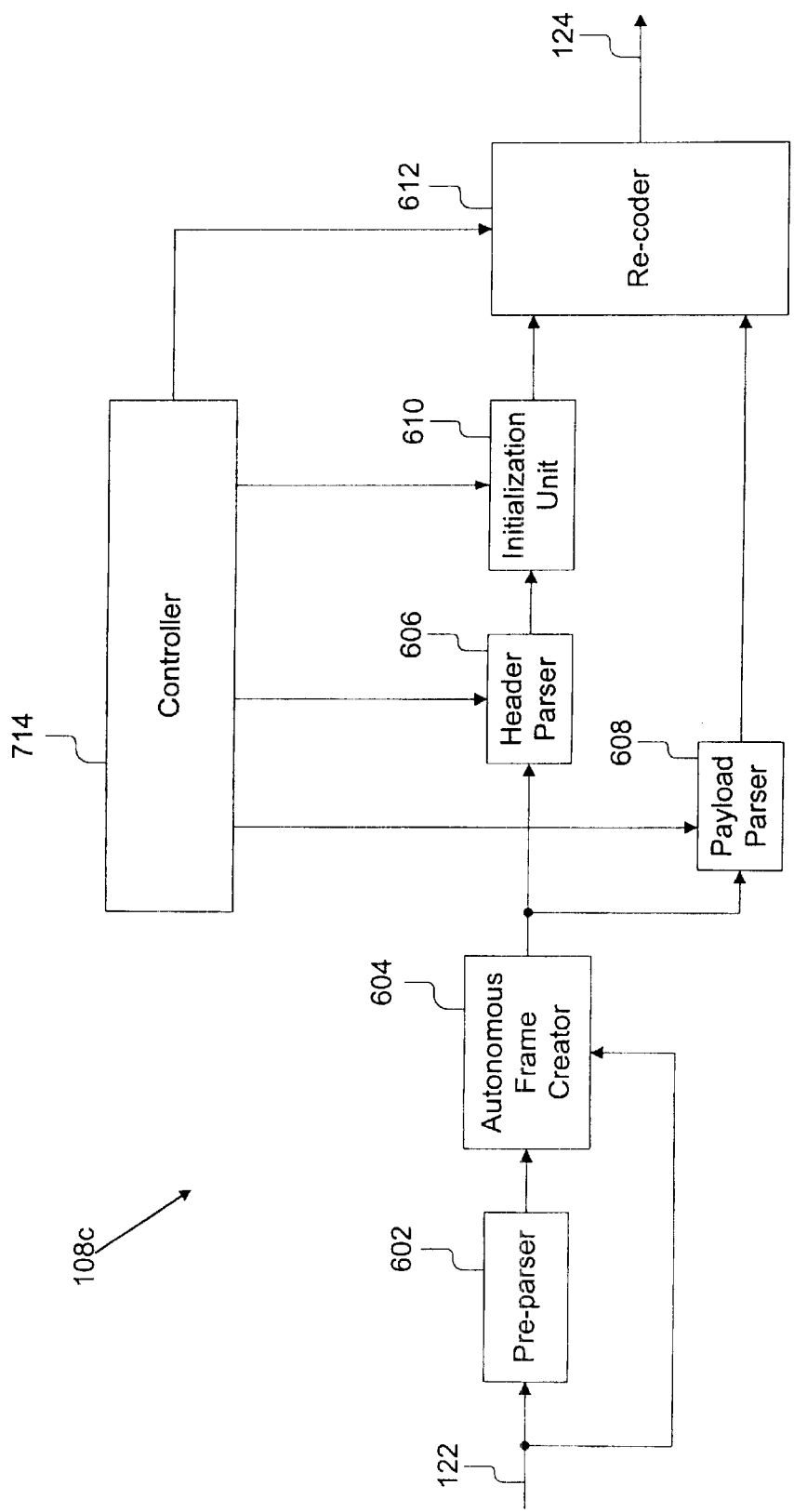
FIG. 7 is a block diagram of a third embodiment for the autonomous frame processing unit of the present invention.

Referring now to FIG. 7, a block diagram of a third embodiment for the autonomous frame processing unit 108c of the present invention is shown. The third embodiment of the autonomous frame processing unit 108c preferably comprises a pre-parser 602, an autonomous frame creator 604, a header parser 606, a payload parser 608, an initialization unit 610, and a recoder 612. Many of the components of the third embodiment are similar to like components of the second embodiment, and like reference numerals have been used for like terms. The third embodiment for the autonomous frame processing unit 108c is also similar to the first embodiment in that the pre-parser 602 and the autonomous frame creator 604 could be considered to be the autonomous frame generator 202; and the header parser 606, the payload parser 608, the initialization unit 610, and the recoder 612 could be considered the autonomous frame recoder 204. The third embodiment for the autonomous frame processing unit 108c also includes a controller 714 that is described in more detail below.

As shown in FIG. 7, the pre-parser 602 has an input coupled to line 122 to sequentially receive a plurality of access units. The pre-parser 602, however, has a single output coupled to the input of the autonomous frame creator 604. The pre-parser 602 is used to generate the AFH. The pre-parser 602 extracts the AUH from the input streams on line 122 and combines the information in the AUH with other auxiliary information to form the AFH. The pre-parser 602 then outputs the AFH to the autonomous frame creator 604. The autonomous frame creator 604 has a second input coupled to line 122 to receive the access units. The autonomous frame creator 604 also parse the access units, but it extracts the AUP, and uses it to form the AFP. The autonomous frame creator 604 then combines the AFP with the AFH from the pre-parser 602 to produce autonomous frames that are provided at the output of the autonomous frame creator 604.

The output of the autonomous frame creator 604 is coupled to the input of both the header parser 606 and the payload parser 606. The header parser 606 operates as has been described above to extract the content in the frame header including the auxiliary information and the AUH. The header parser 606 outputs the auxiliary information and the AUH to the initialization unit 610. The initialization unit 610 applies the auxiliary information and the AUH to the recoder 612 to initialize the recoder 612. Again, the recoder 612 is set to a state just as if it had completed the decoding of the last access unit prior to this access unit. The recoder 612 is a similar type to that disclosed above with reference to FIG. 5. The payload parser 606 also receives the autonomous frames, however, the payload parser 606 extracts the AFP from each autonomous frame and provides the picture data of the AUP to the data input of the recoder 612. The recoder 612 outputs an elementary bitstream that has been recoded to the desired bit rate, whether it's CBR or VBR.

In FIG. 7, the header parser 606, the payload parser 608, the initialization unit 610, and the recoder 612 are controlled by controller 714. The controller 714 determines the sequence of operation among all components, similar to the controller 614 in FIG. 6. In this case, the sequence of operation goes as follows. First, the controller 714 disables the payload parser 608, the initialization unit 610, and the recoder 612 and enables the header parser 606 to parse out the AFH. Second, the controller 714 then enables the initialization unit 610 to use the parsed AFH to initial values used for decoding. Third, the controller 714 enables the operation of recoder 612. By this time, the recoder 612 operates as if it is the middle of the on-going decoding of a continuous stream. The controller 714 enables the payload parser 608 to allow it to parse out the AFP and output the result to the recoder 612.

Figure 9:
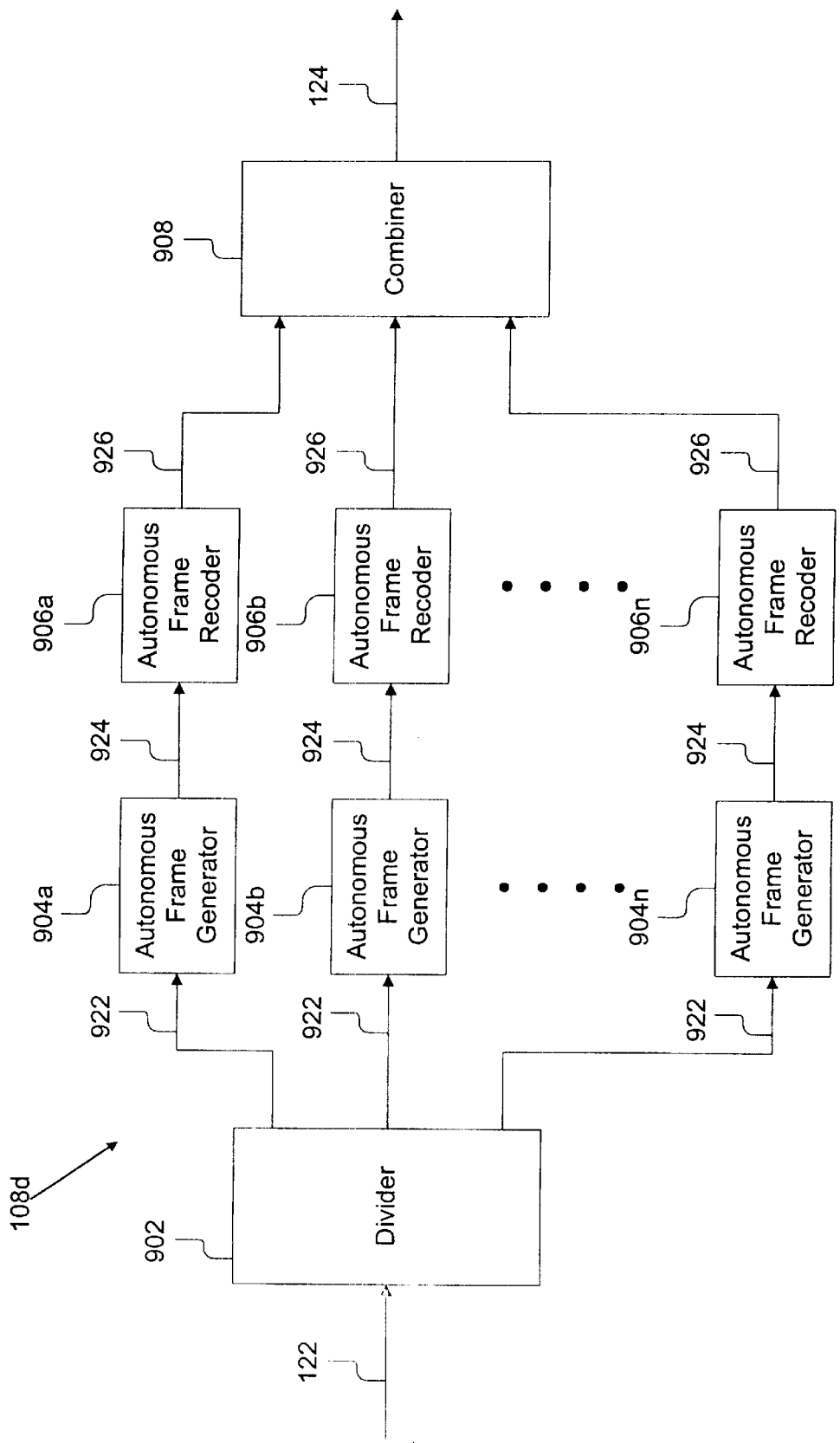
FIG. 9 is a block diagram of a fourth embodiment for the autonomous frame processing unit of the present invention.

Referring now to FIG. 9, a block diagram of a fourth embodiment for the autonomous frame processing unit 108d of the present invention is shown. The fourth embodiment for the autonomous frame processing unit 108d advantageously provides a divider 902, a plurality of autonomous frame generators 904a–904n, a plurality of autonomous frame recoders 906a–906n and a combiner 908. The fourth embodiment for the autonomous frame processing unit 108d provides increased processing speed with a parallel architecture at the cost of multiple autonomous frame generators 904a–904n and autonomous frame recoders 906a–906n. The divider 902 has an input coupled to line 122 to receive access units. The divider 902 sequences or partitions the stream of access units received in a serial form and outputs a plurality of them in parallel. The divider 902 has a plurality of outputs, each output of the divider 902 is coupled to the input of a respective autonomous frame generator 904a–904n. For example, a first output of the divider 902 is coupled by line 922 to the input of autonomous frame generator 904a. It should be understood that each of the autonomous frame generators 904a–904n share a common buffer area (not shown) so that all the auxiliary information needed for the AFH is available to all other autonomous frame generators 904a–904n. The outputs are coupled by other lines 922 to a respective autonomous frame generator 904b–904n. Each of the autonomous frame generators 904a–904n is preferably similar to that described above with reference to FIGS. 2 and 3, and outputs autonomous frames. Each of the autonomous frame generators 904a–904n has an output that is coupled to a respective autonomous frame recoder 906a–906n via line 924. The autonomous frame recoders 906a–906n are preferably similar to that described above with reference to FIGS. 2 and 4. The output of each autonomous frame recoder 906a–906n is coupled by line 926 to a respective input of the combiner 908. The combiner 908 combines the outputs of multiple autonomous recoders 906a–906n into another video bit stream in the same order as that of the original bit stream. The output of the combiner 908 is coupled to and provided on line 124. This architecture is advantageous since the access units from the same video elementary stream are first partitioned into autonomous frame data units and then distributed to different processors (autonomous recoders 906a–906n) for recoding. This scheme allows parallel processing of a single compressed video bit stream.

Figure 10:
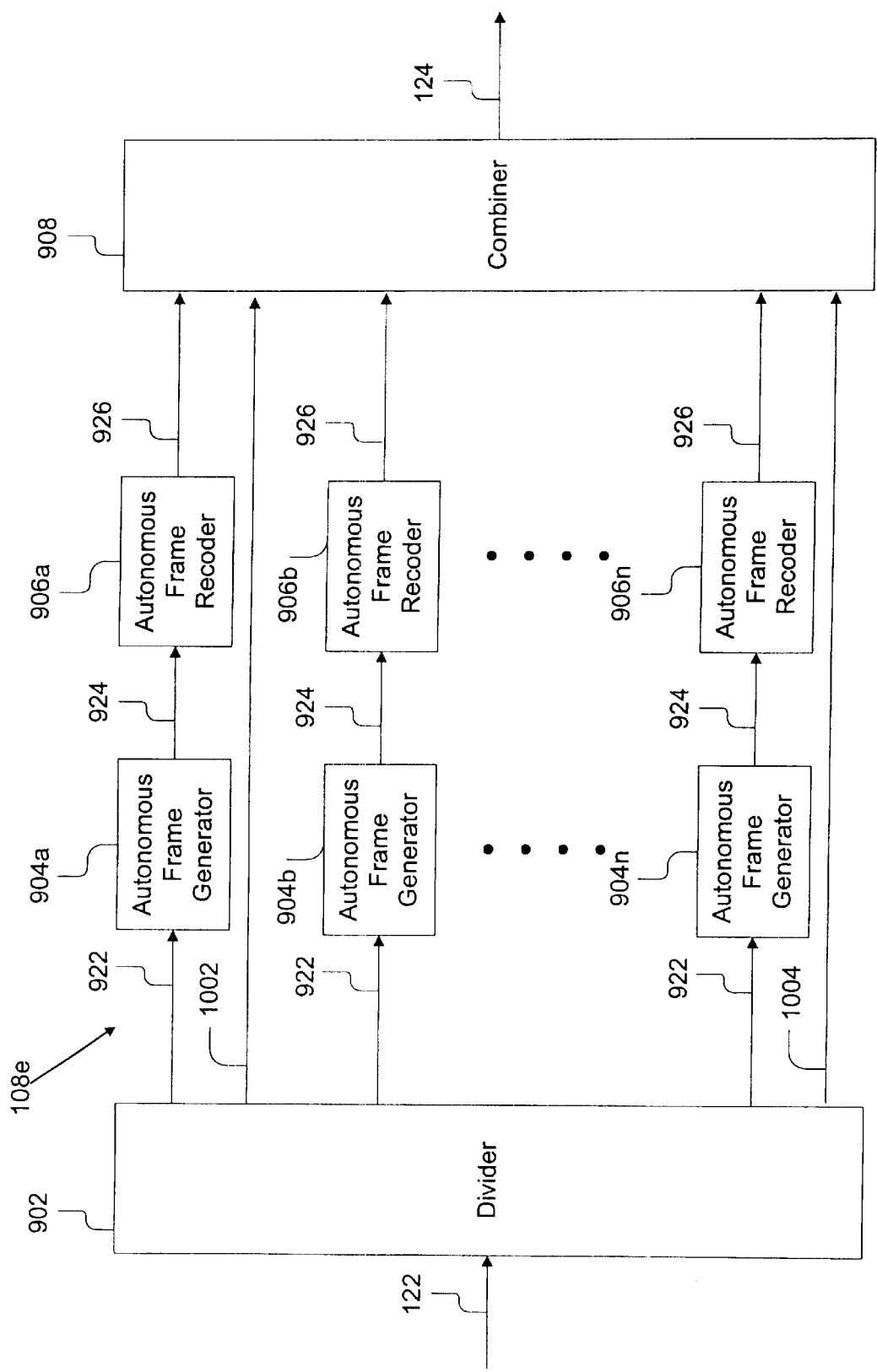
FIG. 10 is a block diagram of a fifth embodiment for the autonomous frame processing unit of the present invention.

Referring now to FIG. 10, a block diagram of a fifth embodiment for the autonomous frame processing unit 108e of the present invention is shown. The fifth embodiment for the autonomous frame processing unit 108e is similar to the fourth embodiment 108d, however, it provides both parallel processing and selective processing. For convenience and ease of understanding, like components from FIG. 9 are provided with like reference numerals and have a similar functionality. The fifth embodiment for the autonomous frame processing unit 108e differs from the fourth embodiment by providing direct transfer lines between one or more of the outputs of the divider 902 and respective inputs of the combiner 908. For example, this is illustrated in FIG. 10 by lines 1002 and 1004. These direct transfer lines 1002 and 1004 allow the incoming video bitstream to be passed directly to the combiner 908 without recoding the access units transferred along these lines 1002 and 1004. The divider 902 provides access units on all its outputs. For the outputs connected to the combiner 908 by the direct transfer lines 1002 and 1004, the access units are passed to the combiner 908 unchanged. Thus, this embodiment provides selective recoding by virtue of selected access units being transferred along the transfer lines 1002 and 1004 while the other pass through autonomous frame recoders 906a–906n. The combiner 908 combines the outputs of multiple autonomous recoders and the direct transfers into another video bit stream in the same order as that of the original bit stream. The divider 902 and combiner 908 of FIGS. 9 and 10 operate in a coordinated manner. Using FIG. 9 as an example, the divider 902 first partitions the incoming (single) bitstream along access unit boundaries. If the input signal is not in elementary stream format, the divider 902 performs the equivalent operations on the associated transport packets, and in this case, the access units are encapsulated as the payload of the corresponding transport packets. Furthermore, the divider 908 delivers the resulting access units to the autonomous frame generators sequentially. The order at which 904a–904n receives the autonomous frames can be, for example, in round-robin order or in some other fixed order. The combiner 908, correspondingly performs the time sequential concatenation operation of the resulting outputs from the autonomous frame recoders 906a–906n by following the same order as the divider 902. Therefore, some form of buffering (although not shown) may also be necessary between the combiner 908 and the autonomous frame recoders 906a–906n as will be understood by those of ordinary skill in the art.

Figure 11:
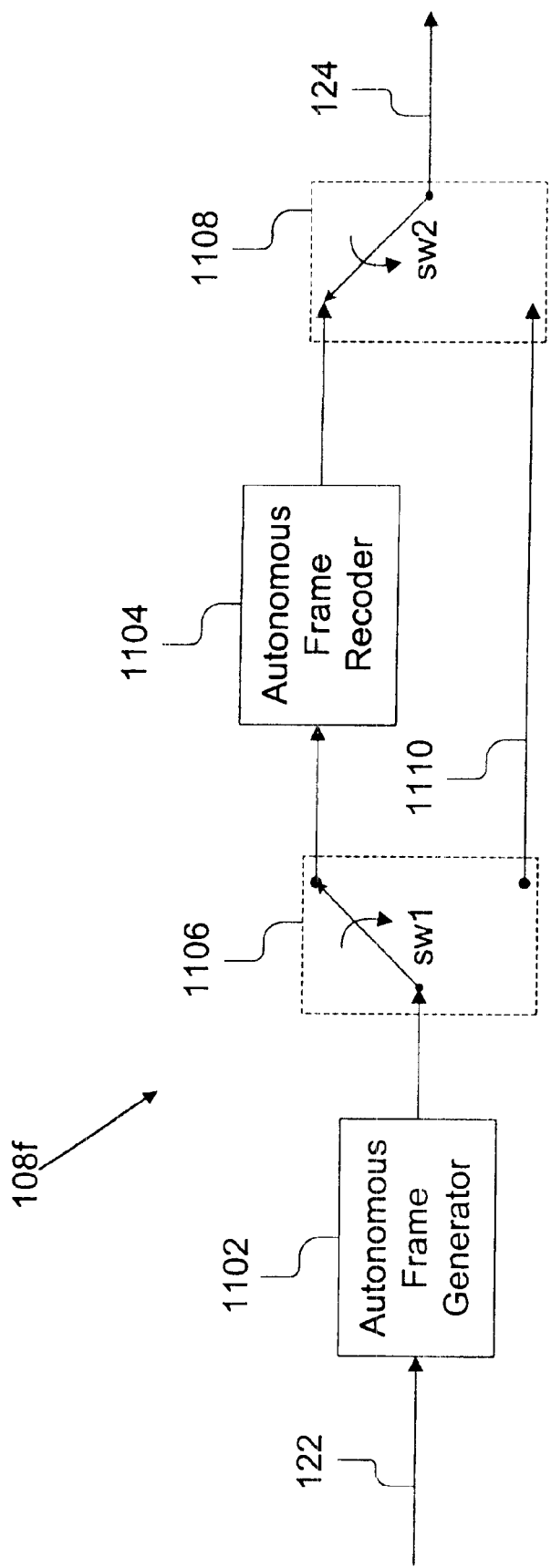
FIG. 11 is a block diagram of a sixth embodiment for the autonomous frame processing unit of the present invention.

FIG. 11 shows a block diagram of a sixth embodiment of the autonomous frame processing unit 108f of the present invention. The sixth embodiment of the autonomous frame processing unit 108f provides selective recoding of a single video bitstream. Selective recoding refers to a process that recodes portions of a compressed video. Specifically, in the preferred embodiment, one access unit may be recoded, while the next one is not recoded. The autonomous frame processing unit 108f preferably comprises an autonomous frame generator 1102, a first switch 1106, an autonomous frame recoder 1104, a second switch 1108, and a by-pass path 1110. The autonomous frame generator 1102 has an input and an output. The input of the autonomous frame generator 1102 is coupled to line 122 to receive a serial stream of access units. The autonomous frame generator 1102 is similar to that described above with reference to FIGS. 2 and 3, and generates an autonomous frame for each access unit. The autonomous frames are output by the autonomous frame generator 1102 to the input of the first switch 1106. The construction of the autonomous frames ensures that the recoding can be done independently using only the autonomous frame as the input. The first switch 1106 also has a first output and an second output. The first output of the first switch 1106 is coupled to the input of the autonomous frame recoder 1104 and the second output of the first switch 1106 is coupled to the by-pass path 1110. The first switch 1106 may be positioned so that it couples the output of the autonomous frame generator 1102 to the input of the autonomous frame recoder 1104, or the output of the autonomous frame generator 1102 to the by-pass path 1110. Thus, the autonomous frames are either recoded by the autonomous frame recoder 1104 or directly passed to the output line 124. The autonomous frame recoder 1104 is similar to that described above with reference to FIGS. 2 and 4, and recodes the autonomous frames. The output of the autonomous frame recoder 1104 is coupled to a first input of the second switch 1108. The second switch 1108 has a pair of inputs and an output, and may be positioned to output either the signal applied at the first input or the signal applied at the second input. The second input of the second switch 1108 is coupled to the by-pass path 1110. The output of the second switch 1108 is coupled to line 124 to provide the selectively recoded bitstream. The first and second switches 1104 and 1108 are synchronized to be switched at the same time to be coupled either the autonomous frame recoder 1104 or the by-pass path 1110. By selectively switching the positions of the first and second switches 1104 and 1108 between bypass or recoding mode, selected autonomous frames may be recoded. The switches 1106 and 1108 are controlled by a separate controller, not shown in FIG. 11, but as will be understood by those of ordinary skill in the art. The controller takes it's decision from algorithms related to the overall recoding needs of the output channel. For example, if the output channel is capable of handling the signal without any further recoding, the controller simply sets both switches to by-pass mode. If the output channel is running into severe bandwidth over usage, the controller may set the two switches to processing through the autonomous frame recoder 1104 all the time. The more general situation is that the controller takes the decision to by-pass or process from a separate rate controller that operates to optimize the bandwidth utilization of the output channel by recoding some autonomous frames only when bandwidth utilization temporarily exceeds capacity.

FIG. 12 is a block diagram of a first statistical re-multiplexer 1200 using autonomous frame processing according to the present invention. Statistical multiplexing, in general, is a technique that simultaneously encodes multiple channels of video signals and combines the resulting bit stream into a single bit stream for transmission. Statistical multiplexing explores the variable rate nature of the compressed video bit streams and the statistical nature of such bit rates. Specifically, it combines multiple channels of variable bit rate (VBR) bit streams of compressed video so that the resulting multiplex has a constant fixed rate. This technique, when properly implemented, results in significant bandwidth savings when transmitting multiple channels of compressed digital video signals. The statistical multiplexing scheme includes the following key components: 1) analysis of video contents to determine the optimal bit budget allocated to each coded picture; 2) coded picture type decision: whether to use motion compensation; 3) coordinated selection of bit rates across all channels to result in total fixed rate; 4) rate control or coding of pictures in each channel that meets the bit usage budget determined by the step 3; 5) monitoring and compensation of timing information on all channels (required to carry real-time compressed video signals); 6) scheduling and multiplexing of different channels into a fixed bandwidth channel.

Statistical remultiplexing is a technique that simultaneously recodes multiple channels of video signals and combines the resulting bit streams into a single bit stream for transmission. The key difference from statistical multiplexing, therefore, is that the inputs to the statistical remultiplexer are pre-compressed bit streams. The recoding, together with the rate control and remultiplexing performs the same functions as that of statistical multiplexing. Statistical remultiplexing allows the system operator to perform statistical multiplexing on pre-compressed video signals without the use of real-time compression systems. The autonomous frame processing can also be used to perform statistical remultiplexing. In this case, the statistical remultiplexer performs recoding, selective or complete recoding, on all of the participating channels so that the multiplexed output bit stream has a given constant rate. Statistical remultiplexing can be considered as the combination of selective recoding and channel hopping (described below). On exemplary embodiment for a statistical re-multiplexer 1200 using autonomous frame processing is shown in FIG. 12 and comprises a plurality of pre-parsers 1202, a process allocator 1204, a plurality of autonomous frame recoders 1206, a re-multiplexer 1208 and a controller 1210.

The plurality of pre-parsers 1202 are similar to those described above with reference to FIGS. 6 and 7. The plurality of pre-parsers 1202 are each respectively coupled to receive a different video stream being statistically multiplexed. The plurality of pre-parsers 1202 convert the access units (or transport packets or PES packets that contain the access unit) into autonomous frames. If one pre-parser is dedicated to the pre-parsing of one channel as preferred, multiple pre-parsers are needed. Otherwise, the same pre-parser may be used, on a time division basis, to handle the pre-parsing of multiple channels of video channels. The outputs of the plurality of pre-parsers 1202 are coupled to respective inputs of the process allocator 1204. The process allocator 1204 assigns one of the plurality of autonomous frame recoders 1206 a given access unit of a given video bit stream, and its corresponding autonomous frame. The process allocator 1204 determines which autonomous frame is going to be processed by which autonomous recoder 1206. The process allocator 1204 implements resource sharing algorithms that attempts to achieve optimal quality under certain constraints. For example, the algorithm may maximize the number of autonomous frame recoders in use at any time when the bandwidth utilization at the output of the re-multiplexer exceeds the channel capacity. The algorithm may also allocate the autonomous frame recoders according to user-set priorities on different video channels by reducing or by-passing recoding activities on those higher priority (namely requires less recoding) channels. A variety of algorithms for implementing statistical multiplexing are known in the art, any one of which may be used to control the operation of the process allocator 1204. The process allocator 1204 has a plurality of outputs each coupled to a respective one of the plurality of autonomous frame recoders 1206, and for delivering autonomous frames. The plurality of autonomous frame recoders 1206 are similar to those that have been described above, and can independently recode autonomous frames. Each of the plurality of autonomous frame recoders 1206 has an output coupled to a respective input of the re-multiplexer 1208. The re-multiplexer 1208 is preferably an MPEG-2 transport packet re-multiplexer that accepts multiple data paths, each carrying a stream of transport packets (or PES packets or simply video elementary stream) which contains one compressed video bit stream and possibly one or more audio or data packets. Finally, a controller 1210 is coupled to the plurality of pre-parsers 1202, the process allocator 1204, the plurality of autonomous frame recoders 1206, and the re-multiplexer 1208. The controller 1210 maintains a database of information from the pre-parser 1202, process allocator 1204, autonomous recoder 1206 and re-multiplexer 1208. The information may include, but is not necessarily limited to, bit usage per coded picture before and after the recoding, state of the processor allocator, buffer conditions in the re-multiplexer, etc. Therefore, the controller 1210 manages the overall operation of the statistical re-multiplexing. It is important here to understand the relationship between the process allocator 1204 and the plurality of autonomous frame recoders 1206. The process allocator 1204 connects a given autonomous frame from one video channel to one of the recoder resources. The connection pattern is not a static one. It is dynamically reconfigured from time to time, depending on the overall statistical multiplexing needs and rate control operation.

FIG. 13 is a block diagram of a second statistical re-multiplexer 1300 using autonomous frame processing according to the present invention. The second statistical re-multiplexer 1300 is used to process multiple channels, and allows the autonomous frame processing to channel hop between any of the input channels. While FIG. 13 illustrates only five channels and a single autonomous frame generator and recoder pair, those skilled in the art will recognize that this embodiment could be adapted to process any number of channels and additional pairs of autonomous frame generators and recoders could be provided. The channel hopping implementation uses the autonomous frame construct to recoder multiple channels of video bit streams. Specifically, a single recoder can be used to recode the autonomous frames from multiple channels of video signals, provided that the recoder has sufficient processing power to handle the tasks.

The channel hopping implementation of the second statistical re-multiplexer 1300 preferably comprises a first crossbar switch 1302, an autonomous frame generator 1304, an autonomous frame recoder 1306, a second crossbar switch 1308 and a controller 1310. In FIG. 13, five video channels are being recoded by the same autonomous frame generator 1304 and autonomous frame recoder 1306. The access units of the five channels input to the first crossbar switch 1302 may or may not be time aligned. The time required to process each of the access units usually varies from frame to frame. Using the autonomous frame generator 1304 and the autonomous frame recoder 1306 it is possible to recode one access unit in one channel and then recode the access unit of another channel. The autonomous frame generator 1304 and the autonomous frame recoder 1306 can either be used to perform the recoding of all channels or recoding of selected access units of all channels, using the approach shown in FIG. 13. The autonomous frame generator 1304 is of the type described above and converts access units into autonomous frames. The autonomous frame recoder 1306 is of the type described above and performs recoding to produce access units or transport packets containing those access units. The first crossbar switch 1302 preferably has a plurality of inputs and an plurality of outputs. The first crossbar switch 1302 is an input switch device that can select the input of the autonomous frame generator 1304 to accept access units (or transport packets) from any given video channel. Similarly, the second crossbar switch 1308 has a plurality of inputs and an plurality of outputs, and is an output switch device that is synchronized with the first crossbar switch 1302 such that the autonomous frame recoder 1306 is always on the same channel as the input selected by the autonomous frame generator 1304. In addition, the first and second crossbar switches 1302, 1308 have the capability to delineate input signals along the access unit boundaries. This is not shown in the figure, but should be assumed as a function of first crossbar switch 1302. The second crossbar switch 1308 performs the reverse function of the first crossbar switch 1302 correspondingly. As shown, this embodiment also includes a plurality of direct transfer paths 1330, 1332, 1334, and 1336 that directly transfer the input video channel if the channel is not selected for input to the autonomous frame generator 1304. Finally, this embodiment includes a controller 1310 coupled to control the first and second cross-bar switches 1302, 1308. The controller coordinates the operation to make sure that the first and second crossbar switches operate in sync, i.e., the processed output from ch1 is sent to the input of crossbar switch associated with ch1, so on and so forth.

While the present invention has been described with reference to certain preferred embodiments, those skilled in the art will recognize that various modifications may be provided. These and other variations upon and modifications to the preferred embodiments are provided for by the present invention which is limited only by the following claims.

What is claimed is:

1. A system for transcoding compressed video streams using a self-contained data unit processing video data, the system comprising:

a self-contained data unit generator having an input and an output for receiving a stream of video data and converting the stream of video data into a plurality of self-contained data units, the input of the self-contained data unit generator coupled to receive compressed video streams; and a self-contained data unit recoder having an input and an output for retrieving recoding parameters, initializing a recoder and recoding video data included in the self-contained data units, the input of the self-contained data unit recoder coupled to the output of the self-contained data unit generator.

2. The system of claim 1 wherein the self-contained data unit generator divides the video stream into a plurality of self-contained data units, each of the self-contained data units having a header portion and a payload portion.

3. The system of claim 2 wherein each of the self-contained data units is an autonomous frame, and an autonomous frame is comprised of:

a frame header including all header information from the original video data plus additional information to allow the frame to be recoded, and a frame payload including the original video data information.

4. The system of claim 1, the self-contained data unit generator further comprises:

a header extraction unit having an input and an output for extracting header information from the video stream, the input of the header extraction unit coupled to receive the stream of video data;

an auxiliary information updating unit having an input and an output for generating the recoding parameters, the input of the auxiliary information updating unit coupled to the output of the header extraction unit;

a payload transfer unit having an input and an output for receiving and identifying picture data and generating a frame payload, the input of the payload transfer unit coupled to receive the stream of video data; and an autonomous frame construction unit having a first input, a second input and an output for producing an autonomous frame, the first input of the autonomous frame construction unit coupled to the output of the auxiliary information updating unit to receive the frame header, and the second input of the autonomous frame construction unit coupled to the output of the payload transfer unit for receiving the frame payload.

5. The system of claim 4, wherein the self-contained data unit generator further comprises an access unit generator having an input and an output for receiving packets at the transport layer and converting them to access units, the input of the access unit generator coupled to receive the stream of compressed video data, and the output of the access unit generator coupled to the input of the header extraction unit and the payload transfer unit.

6. The system of claim 4, wherein the self-contained data unit generator further comprises an autonomous frame header buffer having an input and an output for storing to store the data necessary for re-encoding any given picture, the input of the autonomous frame header buffer coupled to the output of the header extraction unit, and the output of the autonomous frame header buffer coupled to the input of the autonomous frame construction unit.

7. The system of claim 4, wherein the header extraction unit acquires a plurality from the group of picture_header, the picture_extension, the extension_user_data, and user_data out of the video data stream.

8. The system of claim 1, the self-contained data unit recoder further comprises:
    a parser having an input and an output for identifying a header portion from the self-contained data unit for further processing, the input coupled to the output of the self-contained data unit generator for receiving self-contained data unit, the output of the parser providing the identified header portions;
    an initialization unit having an input and an output for receiving recoding parameters from the header portions identified by the parser and providing the recoding parameters as control outputs, the input of the initialization unit coupled to the output of the parser;
    a recoder unit having an first, second and third inputs and an output for modifying the bit rate of a video stream, the first input of the recoder coupled to receive picture data, the second input of the recoder coupled to the output of the initialization unit to receive recoding parameters; and
    a controller for controlling the processing of self-contained data units, the controller coupled to the parser, the initialization unit, and the third input of the recoder for controlling the recoding process.

9. The system of claim 8, wherein the self-contained data unit recoder further comprises a pre-parser having an input, a first output and a second output for separating the header portion and the payload portion of each self-contained data unit, the input of the pre-parser coupled to the output of the self-contained data unit generator for receiving self-contained data units, the first output of the pre-parser coupled to the input of the parser, the second output of the pre-parser coupled to the first input of the recoder.

10. The system of claim 8, wherein the self-contained data unit recoder further comprises a second parser having an input and an output for separating the payload portion of each self-contained data unit, the input of the second parser coupled to the output of the self-contained data unit generator for receiving self-contained data units, the output of the second parser coupled to the input of the recoder.

11. The system of claim 1, wherein the system further comprises:
    a second self-contained data unit generator having an input and an output for receiving a second stream of video data and converting the second stream of video data into a plurality of self-contained data units, the input of the second self-contained data unit generator coupled to receive compressed video streams; and
    a second self-contained data unit recoder having an input and an output for retrieving recoding parameters, initializing a recoder and recoding video data, the input of the second self-contained data unit recoder coupled to the output of the second self-contained data unit generator.

12. The system of claim 11, further comprising:
    a divider having an input and a plurality of outputs, for sequences and partitions the stream of video data, the input of the divider coupled to receive the stream of video data, a first output of the divider coupled to the input of the self-contained data unit generator, and a second output of the divider coupled to the input of the second self-contained data unit generator; and
    a combiner having a plurality of inputs and an output, for combining a plurality of bitstreams, the output of the divider coupled to provide a stream of video data, a first input of the divider coupled to the output of the self-contained data unit recoder, and a second input of the divider coupled to the output of the second self-contained data unit recoder.

13. The system of claim 12, further comprising:
    a plurality of additional pairs of a self-contained data unit generator and a self-contained data unit recoder serially coupled, each of the pair allowing the recoding of video data, and
    wherein the divider has a respective output coupled to the input of one additional pair; and
    wherein the combiner has a respective input coupled to the output of one additional pair.

14. The system of claim 12, further comprising at least one signal line coupled between a respective output of the divider and a respective input of the combiner.

15. The system of claim 1, further comprising:
    a by-pass signal line;
    a first switch coupled to the output of the self-contained data unit generator, the by-pass signal line and the input of the self-contained data unit recoder, the first switch coupling the output of the self-contained data unit generator to either the by-pass signal line or the input of the self-contained data unit recoder; and
    a second switch coupled to the output of the self-contained data unit recoder, the by-pass signal line and an output signal line, the second switch coupling either the output of the self-contained data unit recoder or the by-pass signal line to the output signal line.

16. The system of claim 11, further comprising:
    a first cross bar switch having an plurality of inputs and a plurality of outputs, for coupling one of the inputs to a respective output in response to a first control signal, a first output of the first cross bar switch coupled to the input of the self-contained data unit generator, and a second output of the first cross bar switch coupled to the input of the second self-contained data unit generator; and
    a second cross bar switch having an plurality of inputs and a plurality of outputs, for coupling one of the inputs to a respective output in response to a second control signal, a first input of the second cross bar switch coupled to the output of the self-contained data unit recoder, and a second input of the second cross bar switch coupled to the output of the second self-contained data unit recoder.

17. A method for processing video data, the method including the steps of:
    receiving a video bitstream;
    dividing the video bitstream into a plurality of self-contained data units, each self-contained data unit including a portion of the video bitstream and recoding information;

processing the plurality of self-contained data units using only information contained therein, wherein processing comprises recoding video data in the self-contained data unit.

18. The method of claim 17 wherein the step of dividing the video bitstream into a plurality of self-contained data units, further comprises the steps of:

extracting a plurality of frame headers including header information from the original video bitstream and extracting a plurality of frame payloads including the original video data information.

19. The method of claim 18 wherein the step of dividing the video bitstream into a plurality of self-contained data units, further comprises the step of: updating information in the plurality of frame headers with the current state of a recoder.

20. The method of claim 19 wherein the step of dividing the video bitstream into a plurality of self-contained data units, includes the step of temporarily storing the plurality of frame headers.

21. The method of claim 19 wherein the step of dividing the video bitstream into a plurality of self-contained data units, includes the step of generating a self-contained data unit by combining an extracted frame header with updated auxiliary information and an extracted payload.

22. The method of claim 17 wherein processing the plurality of self-contained data units further comprises:

parsing a self-contained data unit into a header portion and a payload portion; and initializing recoding using the header portion.

23. The method of claim 22 wherein the step of parsing is performed by a first parser that parses a plurality of self-contained data units and identifies and outputs the header portion of each self-contained data unit, and a second parsers that parses the plurality of self-contained data units and identifies and outputs the payload portion of each self-contained data units.

24. The method of claim 17 wherein at least two of the self-contained data units are processed at the same time.

25. The method of claim 24 wherein a first plurality of self-contained data units are not processed while the two of the self-contained data units are processed at the same time.

26. The method of claim 17 wherein at least two of the self-contained data units are processed by different autonomous recoding units.

27. The method of claim 17 wherein a first self-contained data unit is processed and a second self-contained data unit is not processed.

* * * * *